(12) United States Patent
Huilgol et al.

(10) Patent No.: US 7,082,028 B2
(45) Date of Patent: Jul. 25, 2006

(54) ROTATABLE COMPUTER DISPLAY APPARATUS AND METHOD

(75) Inventors: Vivek R. Huilgol, San Francisco, CA (US); Brian E. Healy, Hartland, WI (US); Brian J. Munzel, Saukville, WI (US); Mark M. Gondek, Milwaukee, WI (US); Michael J. Nickel, Milwaukee, WI (US)

(73) Assignee: Swivel It, Inc., San Francisco, CA (US)

( * ) Notice: Subject to any disclaimer, the term of this patent is extended or adjusted under 35 U.S.C. 154(b) by 31 days.

(21) Appl. No.: 10/887,239

(22) Filed: Jul. 8, 2004

(65) Prior Publication Data

US 2006/0007644 A1 Jan. 12, 2006

(51) Int. Cl.
*G06F 1/16* (2006.01)
(52) U.S. Cl. .................................. 361/681; 248/125.1
(58) Field of Classification Search ................ 361/681; 248/125.1, 371
See application file for complete search history.

(56) References Cited

U.S. PATENT DOCUMENTS

| | | |
|---|---|---|
| 696,056 A | 3/1902 | Lamm |
| 3,662,981 A | 5/1972 | Hogrebe |
| 4,267,555 A | 5/1981 | Boyd et al. |
| 4,542,377 A | 9/1985 | Hagen et al. |
| 4,662,797 A | 5/1987 | Helgeland |
| 4,731,030 A | 3/1988 | Johnston |
| 4,762,378 A | 8/1988 | Kagami |
| 4,814,759 A | 3/1989 | Gombrich et al. |
| 4,831,368 A | 5/1989 | Masimo et al. |
| 5,016,849 A | 5/1991 | Wu |
| 5,024,415 A | 6/1991 | Purens |
| 5,030,944 A | 7/1991 | Masimo et al. |
| D322,063 S * | 12/1991 | Oyama ...................... D14/377 |
| 5,100,098 A | 3/1992 | Hawkins |
| 5,125,610 A | 6/1992 | Queau |
| 5,128,662 A | 7/1992 | Failla |
| 5,134,390 A | 7/1992 | Kishimoto et al. |
| 5,177,616 A | 1/1993 | Riday |
| 5,189,404 A | 2/1993 | Masimo et al. |
| 5,206,790 A | 4/1993 | Thomas et al. |
| 5,268,817 A | 12/1993 | Miyagawa et al. |
| 5,321,579 A | 6/1994 | Brown et al. |
| 5,329,289 A * | 7/1994 | Sakamoto et al. .......... 248/922 |
| 5,335,142 A | 8/1994 | Anderson |
| 5,347,630 A | 9/1994 | Ishizawa et al. |
| 5,432,720 A | 7/1995 | Lucente et al. |
| 5,434,964 A | 7/1995 | Moss et al. |
| 5,629,833 A | 5/1997 | Ido et al. |
| 5,659,361 A | 8/1997 | Jin |

(Continued)

FOREIGN PATENT DOCUMENTS

EP 703401 3/1996

(Continued)

*Primary Examiner*—Lisa Lea-Edmonds
(74) *Attorney, Agent, or Firm*—Michael Best & Friedrich

(57) ABSTRACT

Some embodiments of the present invention provide an apparatus and method adapted to control or assist the movement of a display screen relative to a screen housing. In some embodiments, a linkage assembly is adapted to move a display screen relative to a screen housing. Also, some embodiments employ a hub movable within an elongated aperture, and can also have a projection engaged with a second elongated aperture to help control the orientation of the display screen relative to the screen housing. Some embodiments according to the present invention employ lift devices, lock devices, and other display control devices, such as clutches and friction assemblies.

43 Claims, 18 Drawing Sheets

U.S. PATENT DOCUMENTS

| | | |
|---|---|---|
| 5,708,561 A | 1/1998 | Huilgol et al. |
| 5,774,233 A | 6/1998 | Sakamoto |
| 5,791,621 A | 8/1998 | Yashima |
| 5,831,817 A | 11/1998 | Chang |
| 5,923,528 A | 7/1999 | Lee |
| 5,941,493 A | 8/1999 | Cheng |
| 5,973,664 A | 10/1999 | Badger |
| 5,973,915 A | 10/1999 | Evans |
| 6,189,842 B1 | 2/2001 | Bergeron Gull et al. |
| 6,189,850 B1 | 2/2001 | Liao et al. |
| 6,233,139 B1 | 5/2001 | Hamon |
| 6,266,236 B1 | 7/2001 | Ku et al. |
| 6,272,006 B1 | 8/2001 | Lee |
| 6,275,376 B1 | 8/2001 | Moon |
| 6,302,612 B1 | 10/2001 | Fowler et al. |
| 6,346,972 B1 | 2/2002 | Kim |
| 6,437,975 B1 | 8/2002 | Huang |
| 6,441,828 B1 | 8/2002 | Oba et al. |
| 6,504,707 B1 * | 1/2003 | Agata et al. ............. 361/681 |
| 6,510,049 B1 | 1/2003 | Rosen |
| 6,517,040 B1 | 2/2003 | Wen |
| 6,522,529 B1 | 2/2003 | Huilgol et al. |
| 6,639,788 B1 | 10/2003 | Liao et al. |
| 2001/0030656 A1 | 10/2001 | Chan |
| 2001/0048584 A1 | 12/2001 | Rosen |
| 2002/053629 A1 | 5/2002 | Hokugoh |
| 2003/042385 A1 | 3/2003 | Hung et al. |
| 2003/0086240 A1 | 5/2003 | Jobs et al. |
| 2003/0160138 A1 | 8/2003 | Rawlings et al. |
| 2005/0105258 A1 * | 5/2005 | Tanaka et al. ........... 361/681 |

FOREIGN PATENT DOCUMENTS

| | | |
|---|---|---|
| JP | 4058715 | 2/1992 |
| JP | 4058725 | 2/1992 |
| JP | 8063259 | 3/1996 |

* cited by examiner

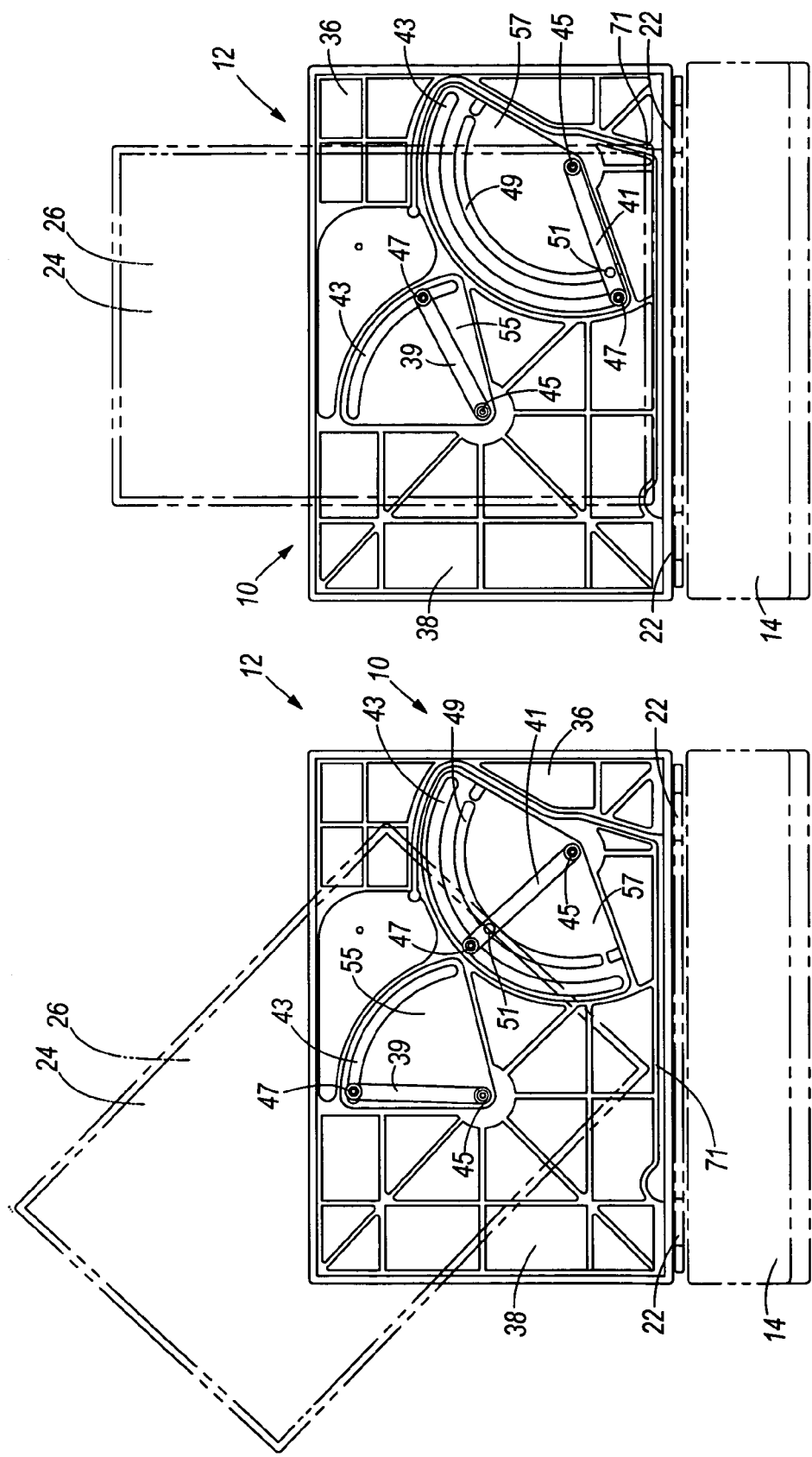

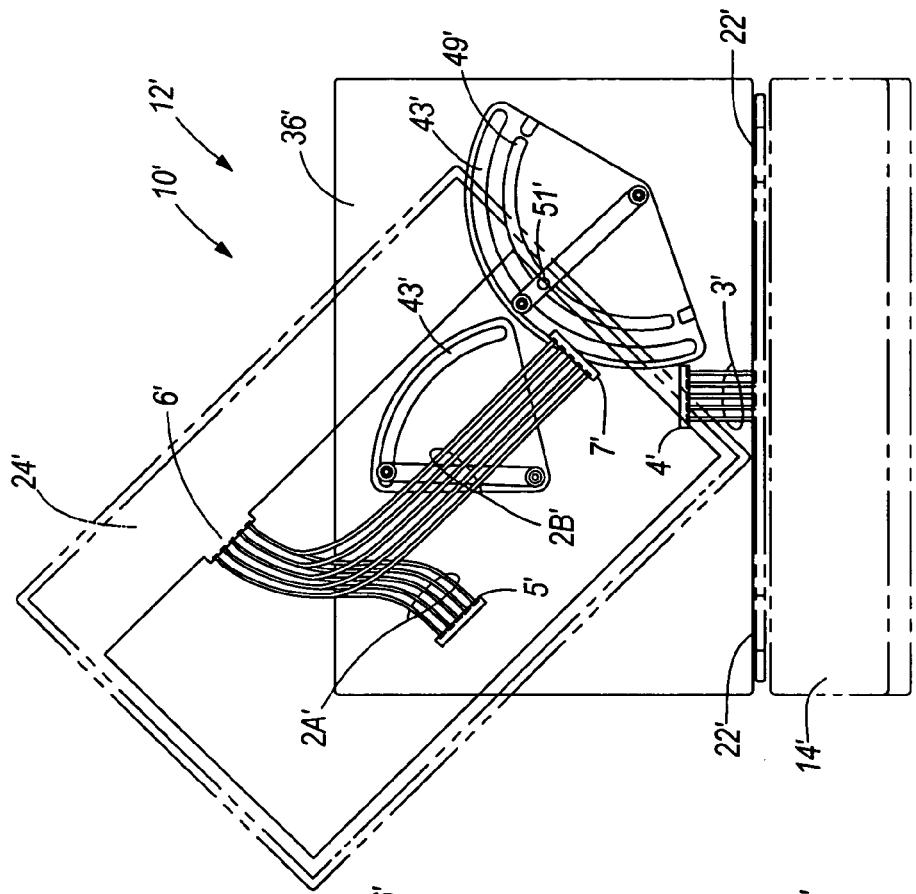
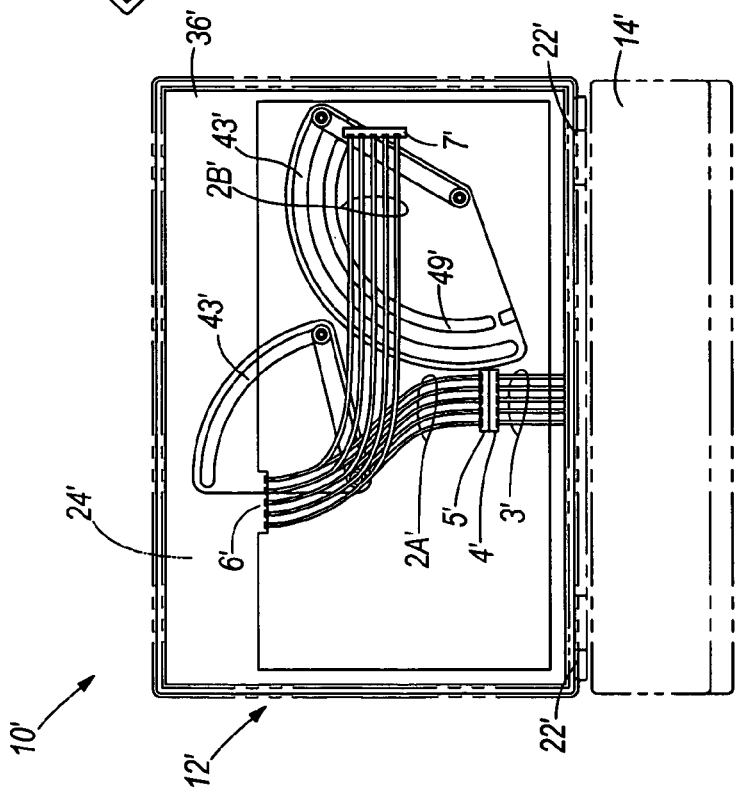

ROTATABLE COMPUTER DISPLAY APPARATUS AND METHOD

BACKGROUND

Many conventional computer monitors and displays allow limited adjustments according to a user's preference. Numerous devices and mechanisms exist to adjust one or more computer display positional attributes, such as tilt, rotational position, and the like. For example, some computer displays permit rotation of the display about an axis generally perpendicular to the screen of the display. Computer displays capable of screen rotation about an axis generally perpendicular to the display screen (hereinafter referred to as a having a "rotatable" screen) often permit a user to place the screen in at least two orientations: a portrait orientation and a landscape orientation typically about 90 degrees apart. As used herein, the terms "landscape" and "portrait" refer to screen orientations that are generally 90 degrees apart, and do not indicate or imply any particular screen shape (e.g., rectangular or square) or dimensions. Examples of computer displays having these capabilities are described and illustrated in two previous patents sharing an inventor in common with the present invention: U.S. Pat. No. 5,708,561 issued on Jan. 13, 1998 and U.S. Pat. No. 6,522,529 issued on Feb. 18, 2003.

SUMMARY OF THE INVENTION

Some embodiments of the present invention provide an apparatus for rotating a display screen relative to a housing from a first orientation to a second orientation, wherein the display screen lies in a plane, and wherein the apparatus comprises: a first link pivotably coupled to the housing at a first point, and pivotably coupled to the display screen at a second point located a distance from the first point; and a second link pivotably coupled to the housing at a third point located a distance from the first and second points, and pivotably coupled to the display screen at a fourth point located a distance from the first, second, and third points; the first link positioned relative to the second link to allow movement of the screen relative to the housing from the first orientation in the plane to the second orientation substantially in the plane.

In some embodiments of the present invention, a method of pivoting a display screen from a landscape orientation to a portrait orientation is provided, and comprises: rotating the display screen relative to a display housing and substantially in a plane in which the display screen lies; rotating the display screen with respect to a first link and about a first axis passing through the plane in response to rotating the display screen, the first link coupling the display screen to a housing; rotating the display screen with respect to a second link and about a second axis passing through the plane in response to rotating the display screen, the second link coupling the display screen to the housing; and controlling movement of the display screen relative to the display housing with the first and second links.

Some embodiments of the present invention provide a pivotable display apparatus for a computer, comprising: a display screen; a housing pivotally coupled to the display screen and having a first elongated aperture and a second elongated aperture; a hub extending away from the display screen into the first elongated aperture of the housing, the hub moveable within and along the first elongated aperture; and a projection extending from the display screen into the second elongated aperture of the housing, the projection limiting rotation of the display screen with respect to the housing in a portion of a range of movement of the hub within the first elongated aperture.

In some embodiments of the present invention, a display orientation device for a display screen coupled to a display housing and rotatable within a plane in which the display screen lies is provided, wherein the display screen has a first orientation with respect to the display housing and a second orientation with respect to the display housing, and wherein the display orientation device comprises a hub extending between the display screen and the display housing, the hub coupled to the display screen in the first and second orientations and resisting rotation of the display screen in the first and second orientations, the hub movable from the first and second orientations to an intermediate position in which rotation the hub and the display screen are rotatable with respect to the display housing.

Some embodiments of the present invention provide a display screen control apparatus for a display screen movable within a plane in which the display screen lies and movable with respect to a display screen housing, wherein the apparatus comprises a projection extending between the display screen and the display screen housing; and a bias element coupled to the projection and positioned to exert a bias force upon the projection to urge the display screen in a direction, the display screen movable with respect to the display screen housing under the bias force exerted by the bias element.

In some embodiments of the present invention, a display screen latching apparatus for a display screen movable with respect to a display screen housing and in a plane in which the display screen lies is provided, and comprises: a catch releasably coupled to the display screen; a user-manipulatable control coupled to the catch and operable by a user to actuate the catch between latched and unlatched positions; wherein the display screen is restrained from movement in the plane with respect to the display screen housing when the catch is in the latched position, and is movable in the plane with respect to the display screen housing when the catch is released by the user-manipulatable control to the unlatched position.

Some embodiments of the present invention provide a display screen control apparatus for a display screen movable within a plane in which the display screen lies and movable with respect to a display screen housing, wherein the apparatus comprises: a hub extending between the display screen and the display screen housing and received within an aperture in the display screen housing; a slide coupled to the hub and movable to a plurality of different positions along the aperture corresponding to a plurality of different positions of the display screen with respect to the display screen housing; a resiliently deformable washer coupled to the hub and exerting a load upon the slide to bias the slide into frictional engagement with the housing; and a fastener coupled to the hub to retain the resiliently deformable washer on the hub.

In some embodiments, a display screen control apparatus for a display screen movable within a plane in which the display screen lies and movable with respect to a display screen housing is provided, and comprises: at least one projection extending from the display screen housing; an elongated flexible element coupled to the display screen housing and extending at least partially around the at least one projection; and a hub coupled to the display screen and to the elongated flexible element; wherein the elongated flexible element is movable about the at least one projection to at least partially control movement of the hub and display screen with respect to the display screen housing.

Some embodiments of the present invention provide a method of rotating a display screen with respect to a computer, comprising: providing a first electrical connection between the display screen and the computer in a first orientation of the display screen; rotating the display from the first orientation; disconnecting the first electrical connection by rotating the display from the first orientation; rotating the display to a second orientation different than the first orientation; and establishing a second electrical connection between the display screen and the computer by rotating the display to the second orientation.

In some embodiments, a display releasably coupled to a first electrical connector establishing at least one of power and communication to the display is provided, and comprises: a display screen rotatable within a plane in which the display screen lies, rotatable with respect to a display screen housing, and rotatable between first and second orientations with respect to the display screen housing; and a second electrical connector coupled to the display screen and selectively electrically coupled to the first electrical connector by rotation of the display screen between the first and second orientations.

Further aspects of the present invention, together with the organization and operation thereof, will become apparent from the following detailed description of the invention when taken in conjunction with the accompanying drawings.

BRIEF DESCRIPTION OF THE DRAWINGS

The present invention is further described with reference to the accompanying drawings, which show various embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

FIGS. 7A–7C are front views of the laptop computer illustrated in FIG. 6, shown with the display screen and screen backing in different stages of movement between landscape and portrait orientations.

FIGS. 12A–12C are front views of another alternative embodiment of a display according to the present invention, shown with the display screen and screen backing in phantom and in different stages of movement between landscape and portrait orientations.

DETAILED DESCRIPTION

Figure 1:
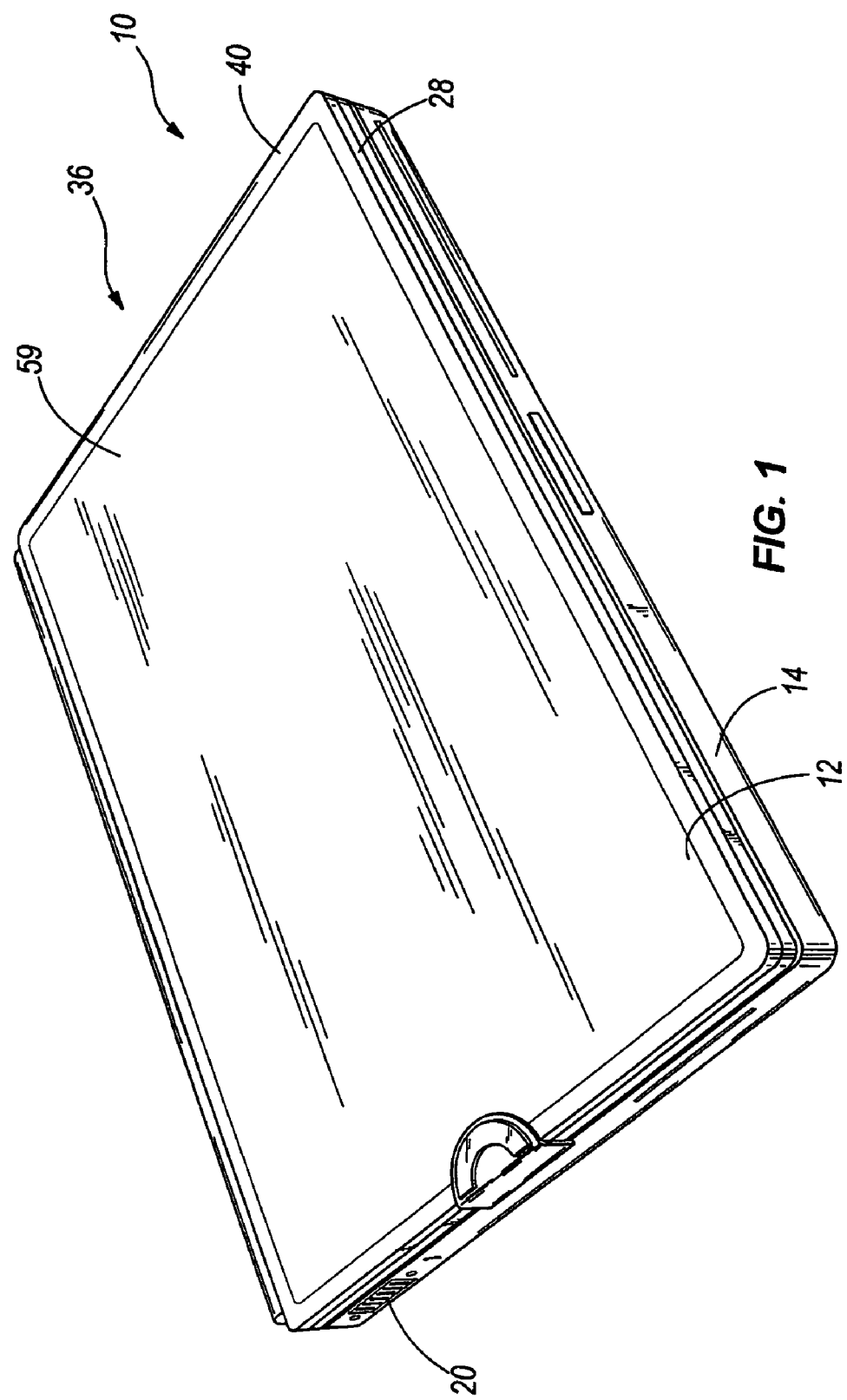
FIG. 1 is a perspective view of a laptop computer according to an embodiment of the present invention, wherein the display is in a closed position.
Figure 2:
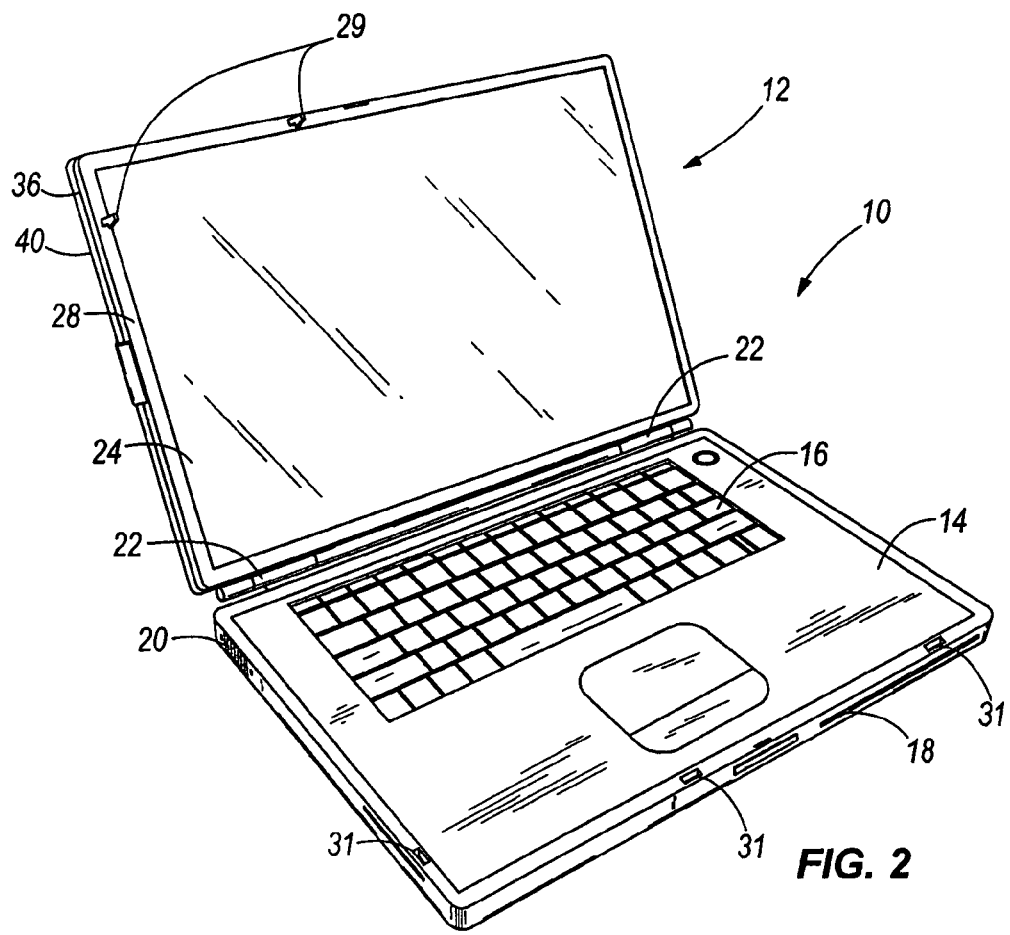
FIG. 2 is a front perspective view of the laptop computer illustrated in FIG. 1, with the display in an open position and a screen in a landscape orientation.
Figure 3:
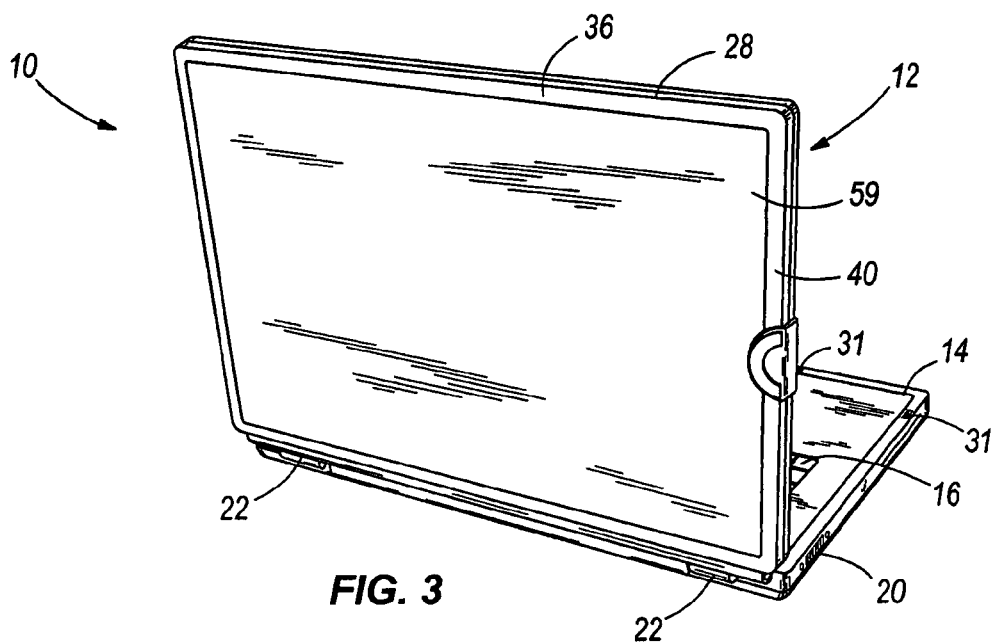
FIG. 3 is a rear perspective view of the laptop computer illustrated in FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention can include both mechanical and electronic components or modules that, for purposes of discussion, can be illustrated and described as if the majority of the components were implemented solely in mechanical embodiments. However, one of ordinary skill in the art will recognize that, in at least one embodiment of the present invention, the mechanically based aspects of the invention can be implemented using electronics or electromechanical devices. Furthermore, and as described in subsequent paragraphs, the specific mechanical configurations illustrated in the drawings are intended to exemplify different embodiments of the invention. Still other alternative mechanical configurations are possible.

With reference to FIGS. 1–5, a laptop computer 10 having a display is illustrated. The term "display" is used herein and in the appended claims to refer to a computer monitor, display, and any other device used in conjunction with a computer for displaying text and/or graphics upon a screen in any manner. The term "display" refers collectively to the screen upon which such text and/or graphics is displayed, as well as the movable housing, frame, or other structure within or upon which the screen is mounted. Although the display is shown in conjunction with a laptop computer in the illustrated exemplary embodiments, the display 12 of the present invention can be used in conjunction with virtually any type of computer. Furthermore, any type of display screen can be employed in conjunction with the various features and elements of the present invention, including without limitation a cathode ray tube (CRT) display, liquid crystal display (LCD), plasma display panel (PDP), a field emission display (FED), an organic light emitting diode display (OLED) and the like.

The illustrated laptop computer 10 has a base 14 with a keyboard 16, internal electronics (not shown), one or more ports 18 for removably receiving media storage and retrieval devices (such as diskettes, compact disks, drives, and the like) and a battery, and one or more ports 20 for connection of the computer 10 to electrical cables, leads, or other external wiring leading to associated equipment.

The display 12 is pivotally mounted to the base 14 of the computer 10 in any manner, such as by one or more hinges 22 as shown in the figures. The illustrated display 12 is therefore movable between a position in which the display 12 lies adjacent and substantially parallel to the base 14 and a position in which the display 12 is at an angle to the base 14 for user viewing. The display 12 has a screen 24 upon which graphics and/or text can be displayed in any conventional manner. Display screens (such as display screen 24) and their operation are well known to those skilled in the art and are not therefore described further herein. It should be noted that such a rotatable display is adapted for a number of applications such as on a laptop computer. However, many other applications of the display 12 can employ significantly different mounting arrangements, such as a generally vertical post mount permitting the display 12 to rotate about a substantially vertical axis, a ball and socket-type mount providing one or more degrees of freedom for the display position to be adjusted, and display mounts that do not permit display positional adjustment. In each case, the display 12 need not necessarily be mounted upon a computer base 14 as shown in the figures, but can instead be freestanding, connected in any conventional manner to a stand or platform, etc. In short, even though the position of the display screen 24 can be adjusted in a manner as will be described below, the position of the entire display 12 can be adjustable or non-adjustable as desired for any given application.

Figure 8:
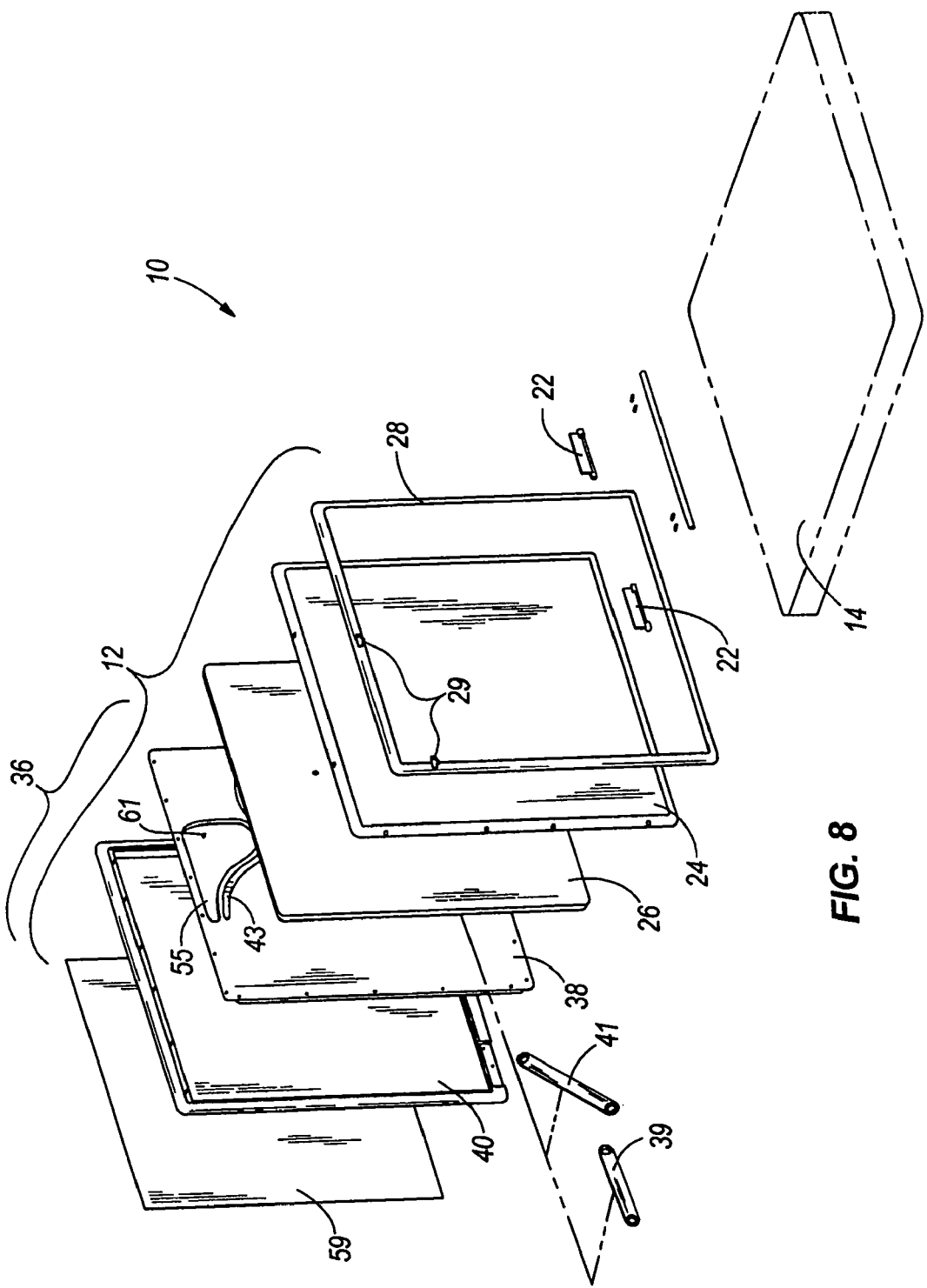
FIG. 8 is an exploded perspective view of the laptop computer illustrated in FIG. 6, shown with the computer base in phantom.
Figure 9:
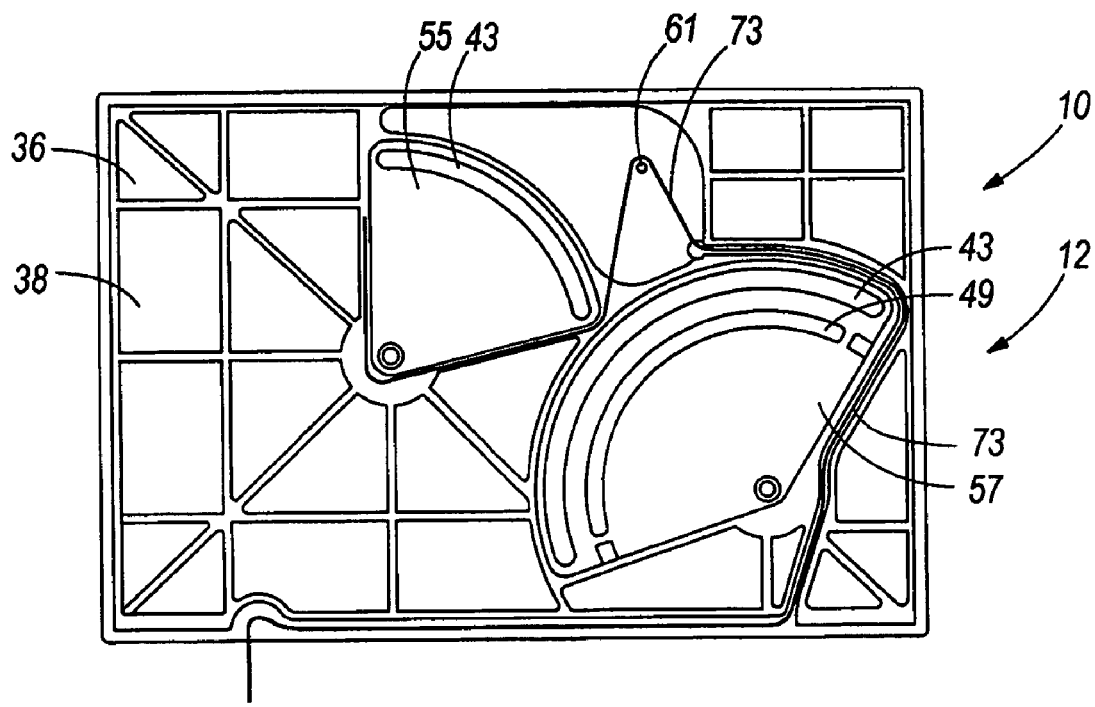
FIG. 9 is a front view of the chassis illustrated in FIGS. 6–8.

Referring to FIG. 8, the illustrated display screen 24 has a screen backing 26 attached to the display screen 24 in any conventional manner, such as by being crimped or press-fit thereon, being fastened thereto by conventional fasteners such as rivets, screws, and the like, being soldered or glued thereon, etc. The display screen 24 can also have a frame 28 attached to the display screen 24 in any conventional manner just described.

The illustrated display 12 also has a screen housing 36 located behind the display screen 24 and screen backing 26 as best shown in FIG. 8. The illustrated screen housing 36 has a chassis 38 (see FIGS. 4 and 6–9) and a cover plate or shell 40 (see FIGS. 1–3, 5, 6, and 8), and can have a decorative cover 59 (see FIGS. 1, 3, 5, and 8). The chassis 38, shell 40, and cover 59 can be coupled together in any suitable manner. For example, they can be adhered, welded, bonded, fastened, etc. The display 12 can be coupled to the base 14 via any number of hinges 22, such as a single hinge 22 (e.g., a single complex hinge) or a pair of hinges 22 as shown. The hinges 22 can have apertures to allow wires to pass between the display 24 and the base 14.

The frame 28, screen backing 26, and components of the screen housing 36 can be made of any rigid or substantially rigid material desired, including without limitation plastic, metal (e.g., aluminum, steel, titanium, alloys, etc.), composites, or combinations thereof. Furthermore, the screen backing 26 can be made from an electromagnetic interference-shielding material, while the frame 28 and screen housing 36 can be made of plastic.

Figure 4:
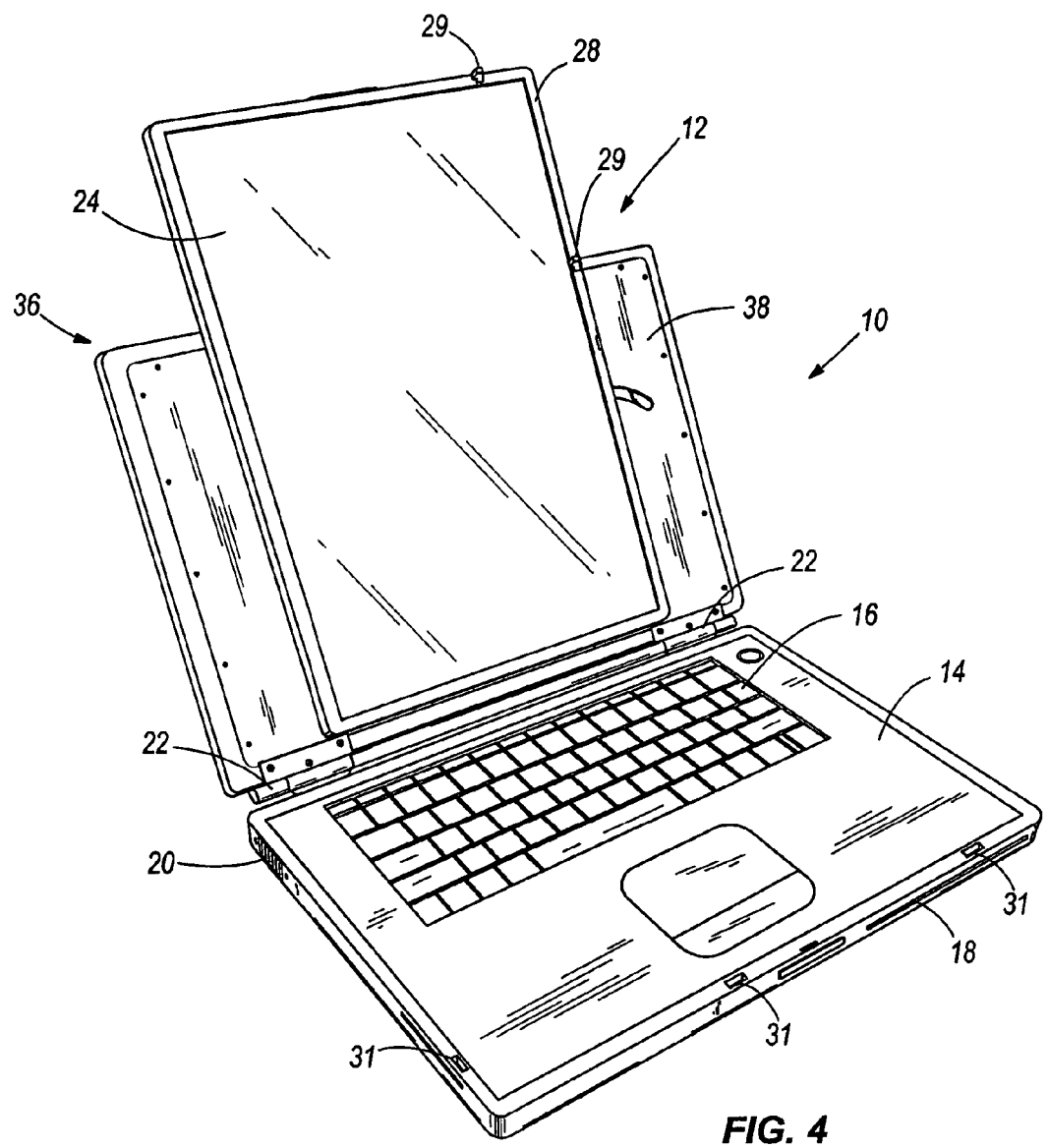
FIG. 4 is a perspective view of the laptop computer illustrated in FIG. 1, with the display in an open position and the screen in a portrait orientation.
Figure 5:
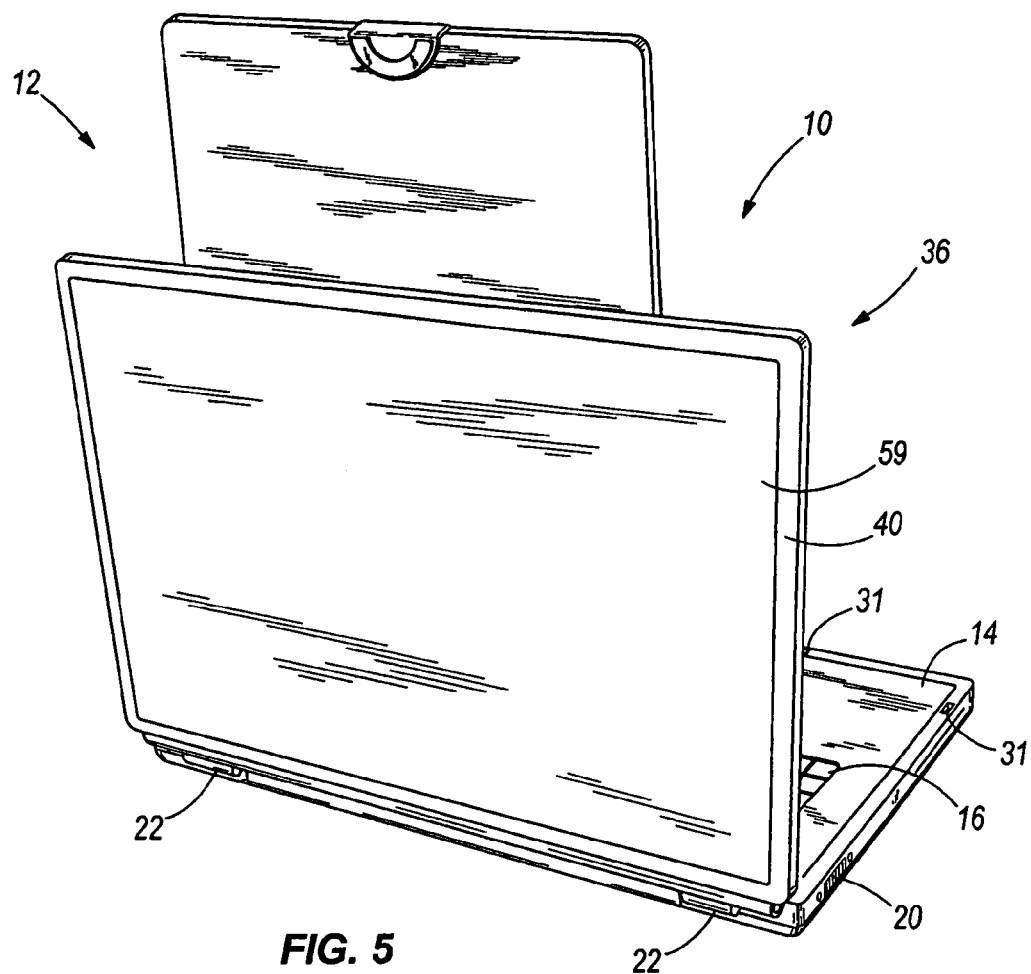
FIG. 5 is a rear perspective view of the laptop computer illustrated in FIG. 4.
Figure 6:
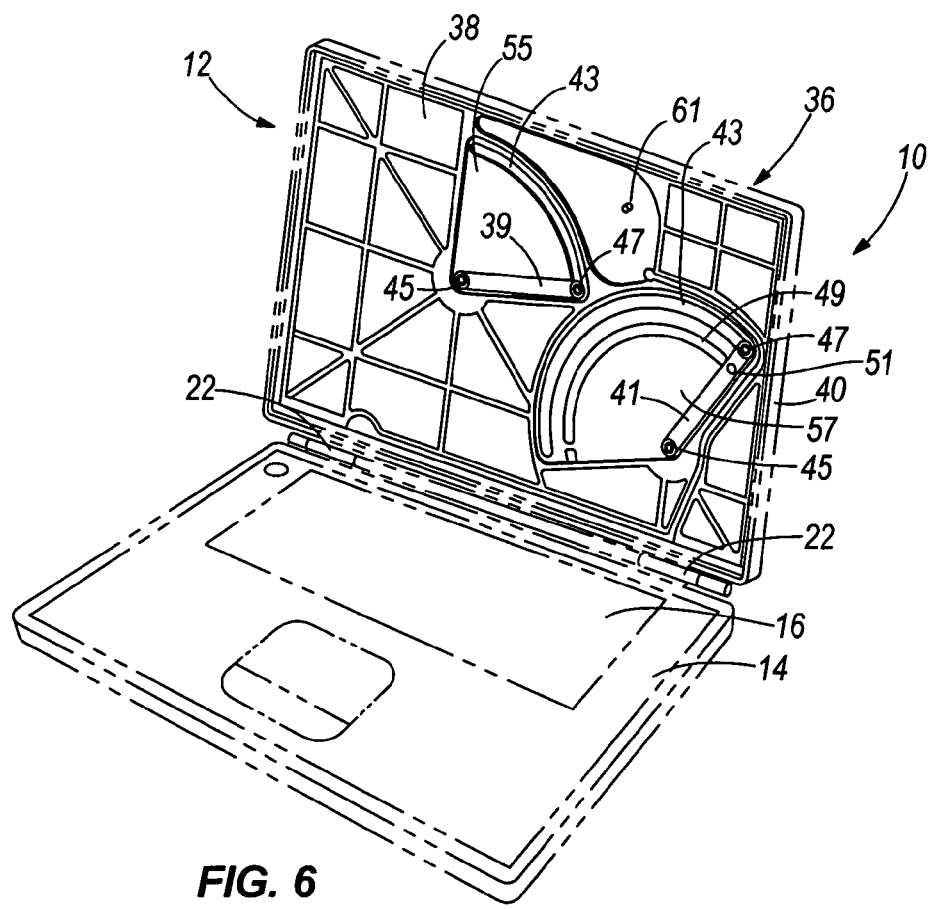
FIG. 6 is a partial perspective view of the laptop computer illustrated in FIGS. 1–4, shown with the display screen, screen backing, and computer base in phantom.
Figure 7A:
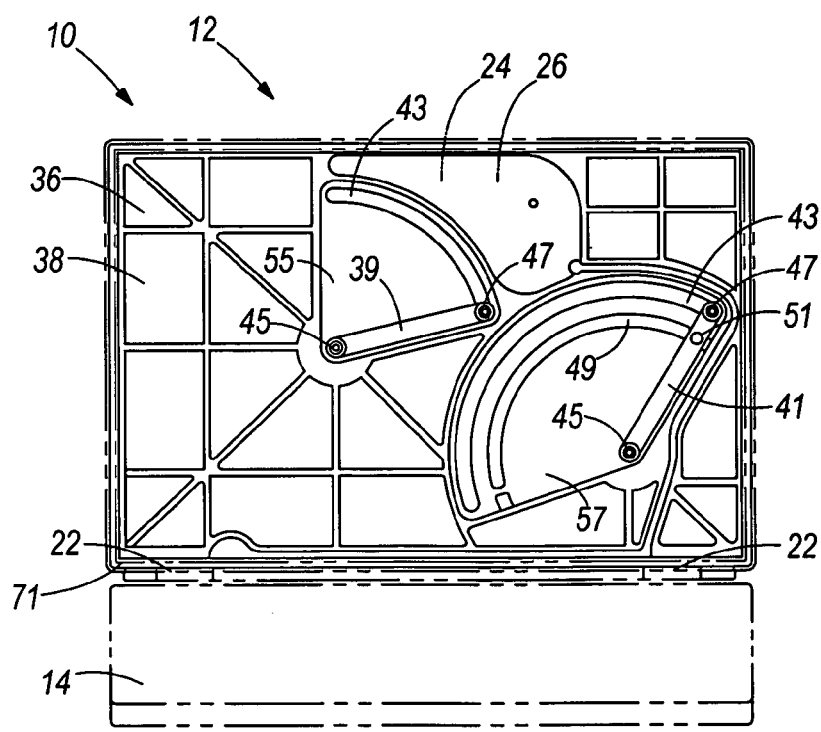

As illustrated in FIGS. 2–7C, the display screen 24 and screen backing 26 are movable relative to the screen housing 36. Specifically, as shown in these figures, the display screen 24 and screen backing 26 can move relative to the screen housing 36 between a landscape position (FIGS. 2, 3, and 7A) and a portrait position (FIGS. 4, 5, and 7C). As will be discussed further herein, the display screen 24 of some embodiments can between different positions relative to the screen housing 36 by rotating, translating, or a combination of rotating and translating. One or more devices, as discussed herein, can be positioned within the display 12 to selectively allow or control the relative movement between the display screen 24 and the screen housing 36.

Many laptop computers have a latch that can selectively prevent the display 12 from pivoting with respect to the base 14. Typically, a projection on the display 12 or base 14 engages a catch on the base 14 or display 12, respectively, to control the relative movement between the two. However, such latches may not operate properly with the display screen 24 in one or more rotational positions relative to the screen housing 36. For example, a projection of the latch may not properly align with a catch when the display screen 24 is rotated to a portrait orientation. Thus, some embodiments of the present invention are provided with a second latching feature to allow the display 12 to be latched to the base 14 while the display screen 24 is rotated relative to the screen housing 36. In the illustrated embodiment of FIGS. 1–10 for example, two latch projections 29 are located on the frame 28. Both latch projections 29 are received in respective catch apertures 31 in the base 14 when the display 12 is closed while the display screen 24 is in a portrait orientation. However, when the display 12 is closed while the display screen 24 is in a portrait orientation as shown in FIGS. 4 and 5, one of the latch projections 29 mates with another catch aperture 31 in the base 14 (see FIGS. 2–5). Such a secondary latching feature thereby enables the display 12 to be secured in a closed position regardless of whether the display screen 24 is in a landscape or portrait orientation. Secondary latching features can instead include an additional projection on the base 14 positioned to engage a catch aperture on the display 12. In other embodiments, separate latches are used to secure the display 12 to the base 14 in the portrait and landscape orientations of the display screen 24.

One particular embodiment of a display pivoting apparatus is illustrated in FIGS. 6–10. As illustrated in these figures, this embodiment utilizes first and second links 39, 41 to move the screen 24 from one position to another. The two links 39, 41 can be positioned within the display 12 to allow movement of the display screen 24 and screen backing 26 relative to the screen housing 36. The links 39, 41 extend between the screen backing 26 and the chassis 38, and are movable with the screen 24 in a manner similar to that of a four bar linkage (two bars defined by the links 39, 41 and two bars defined by portions of the chassis 38 and the display screen 24 or screen backing 26).

Figure 10:
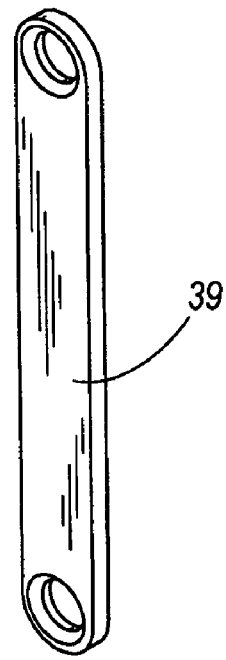
FIG. 10 is a perspective view of a link of the display illustrated in FIG. 8.

A closer view of the first link 39 is shown in FIG. 10. The first link 39 is relatively elongated and planar in shape. The second link 41 is similar in shape and is somewhat longer than the first link 39. However, it should be noted that each link 39, 41 can have any other shape and dimensions desired while still providing the pivotal connections to the screen backing 26 and chassis 38 described herein. For example, either or both links 39, 41 can have curved or irregular shapes, such as to better enable connection of elements to the links 39, 41, to provide abutment surfaces appropriately positioned along any part of the links 39, 41, and the like.

Each end of the links 39, 41 is secured to either the screen backing 26 or the chassis 38 via a pivot 45, 47. The pivot 45, 47 can be any type of fastener, such as a threaded fastener, a rivet, an attached rod or post, and the like. A first end of each link 39, 41 is connected to the chassis 38 via pivot 45, while the opposite end of each link 39, 41 is connected to the screen backing 26 via a pivot 47. As illustrated, the links 39, 41 can have recessed apertures located at either or both ends. The recesses can receive the ends of pivots 45, 47 or retaining devices (e.g., screws or other fasteners) coupled to the ends of the pivots 45, 47. The use of recessed apertures can save space within the display 12. Furthermore, the links 39, 41 can have apertures through which pivots are received as described above and/or can have pivots 45, 47 that are integral with the links 39, 41. For example, the two links 39, 41 in the illustrated embodiment of FIGS. 1–10 can have any combination of apertures for receiving pivots 45, 47 and pivots 45, 47 that are integral with the link(s) 39, 41.

The links 39, 41 can be made of any rigid or substantially rigid material desired, including without limitation plastic, metal (e.g., aluminum, steel, etc.), composites, or combinations thereof.

The pivots 47 connecting the screen backing 26 to the links 39, 41 trace an arcuate path relative to the screen housing 36 as the display screen 24 rotates from one position to another. Referring to FIGS. 6–7C, it can be seen that some embodiments utilize curved apertures 43 that shadow the movement of the pivots 47. These curved apertures 43 can guide the movement of the links 39, 41 from one orientation to another and can add stability and control to the linkage system. In some embodiments, the use of such apertures 43 to guide the links 39, 41 provides additional stability for the display screen 24, which can be supported upon the chassis 38 in a generally cantilevered manner via the links 39, 41. In particular, each link 39, 41 in the illustrated embodiment of FIGS. 1–10 is coupled to the chassis by a pivot 45, and supports the display screen 24 upon the pivot 45 in a cantilevered fashion. The additional stability provided by receiving the pivots 47 in apertures 43 as described above can result in improved movement of the display screen 24 and links 39, 41 as the display screen 24 is rotated, and can reduce or eliminate undesirable movement of the display screen 24 relative to the chassis 38.

In alternative embodiments of the present invention, either or both curved apertures 43 can be located in other structures of the display 12. For example, the illustrated structure can be reversed such that the curved apertures 43 are located in the screen backing 26 rather than in the chassis 38. Additionally, in some embodiments, curved apertures 43 can be positioned in both the chassis 38 and the screen backing 26. For example, the aperture 43 in which the pivot 47 of one link 39 moves can be located in the chassis 38 while the aperture 43 in which the pivot 47 for the other link 41 moves can be located in the screen backing 26. As another example, either or both pivots 47 of the links 39, 41 can be received within and can be movable along respective curved apertures 43 in the screen backing 26.

The curved apertures 43 illustrated in FIGS. 6 and 7 can help restrain undesirable movement of the display screen 24, such as movement of the display screen 24 in a direction toward and away from the rest of the screen housing 36. The curved apertures 43 can help to reduce or eliminate such movement by restraining axial movement of the pivots 47 in the curved apertures 43. In some embodiments, the pivots 47 can each have at least one projection on at least one side of the chassis 38 for this purpose. For example, the pivots 47 can have one or more flanges, enlarged portions, collars, radially projecting fingers, washers, and the like located on either side or both sides of the chassis 38, thereby limiting the ability of the pivots 47 to move axially in the curved apertures 43. Such features of the pivots 47 can be defined by an integral portion of each pivot 47 or by a separate element coupled to the pivot 47 in any suitable manner (such as by welding, bonding, adhering, soldering, or brazing, operations, by one or more conventional fasteners, by press or friction fitting, by spring clips, and the like). Although such projecting features or elements of the pivots 47 can be located on only one side of the chassis 38, in some embodiments these projections are positioned on both sides of the chassis 38 to prevent movement of the display screen 24 both toward and away from the screen housing 36.

As illustrated in FIGS. 6, 7A–C, and 9, some embodiments can provide more than one curved aperture for one or more of the links 39, 41. For example, link 41 in the illustrated embodiment of FIGS. 1–10 has two curved apertures 43, 49 for controlling the movement of the display screen 24 relative to the screen housing 36. The link 41 has a projecting member 51 (see FIGS. 7A–C) that resides within the curved aperture 49. The projecting member 51 can restrain the link 41 and display screen 24 from moving in a direction parallel to the axis of the pivots 45, 47. In some embodiments, the projecting member 51 has flanged surfaces located on either side of the chassis 38 to prevent movement of the link 41 and display screen 24 away from the chassis 38.

The beginning and-end rotational position for each link 39, 41 can be at least partially defined by the curved apertures 43, 49. For example, the pivots 47 can abut the ends of the apertures 43 to define the beginning and end rotational positions of the links 39, 41. As best illustrated in FIGS. 7A–C, while the screen 24 is in the landscape orientation, the pivots 47 for the links 39, 41 can abut one end of each curved aperture 43. Furthermore, once the display screen 24 is moved to the portrait orientation, the pivots 47 can abut an opposite end of each curved aperture 43. Projection 51 can also be used to control the rotational position of the display screen 24 instead of or in addition to the pivots 47. The projection 51 can abut the opposite ends of the curved aperture 49 to define the either or both rotational limits of the display screen 24.

Referring to FIGS. 6 and 7A–C, it can be seen that the links 39, 41 are each positioned within a recessed area 55, 57 of the chassis 38. Sidewalls of the recessed areas 55, 57 can be used as stops to define the rotational extents of the links 39, 41.

Figure 11B:
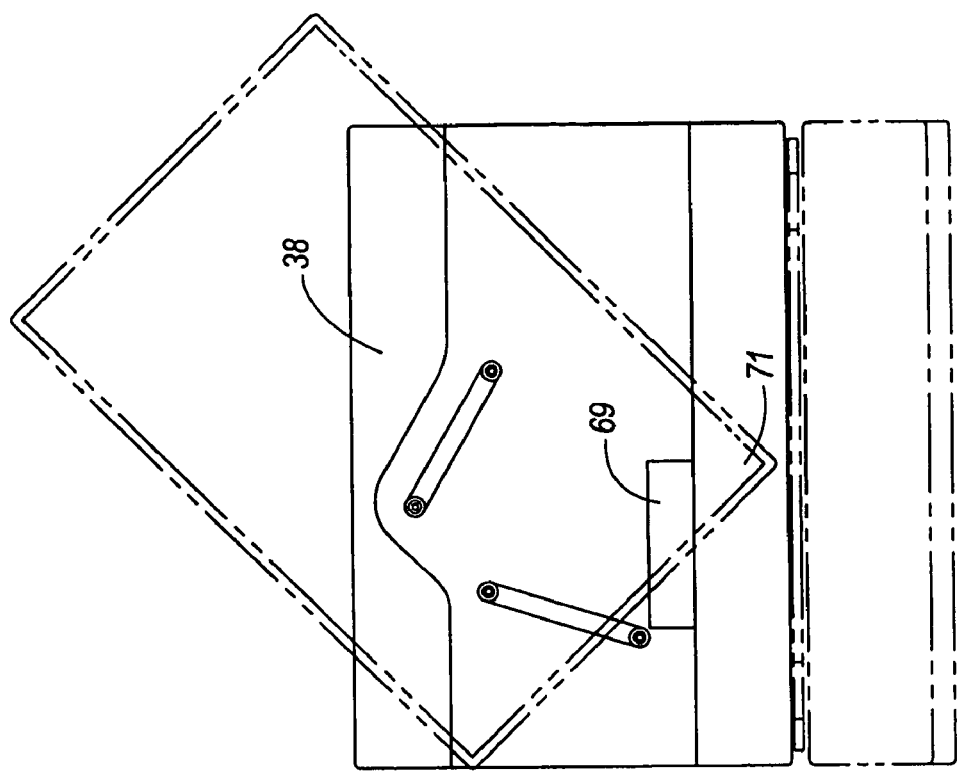
FIG. 11A–11C are front views of a laptop computer having a display according to an alternative embodiment of the present invention, shown with the display screen and screen backing in phantom and in different stages of movement between landscape and portrait orientations.
Figure 11A:
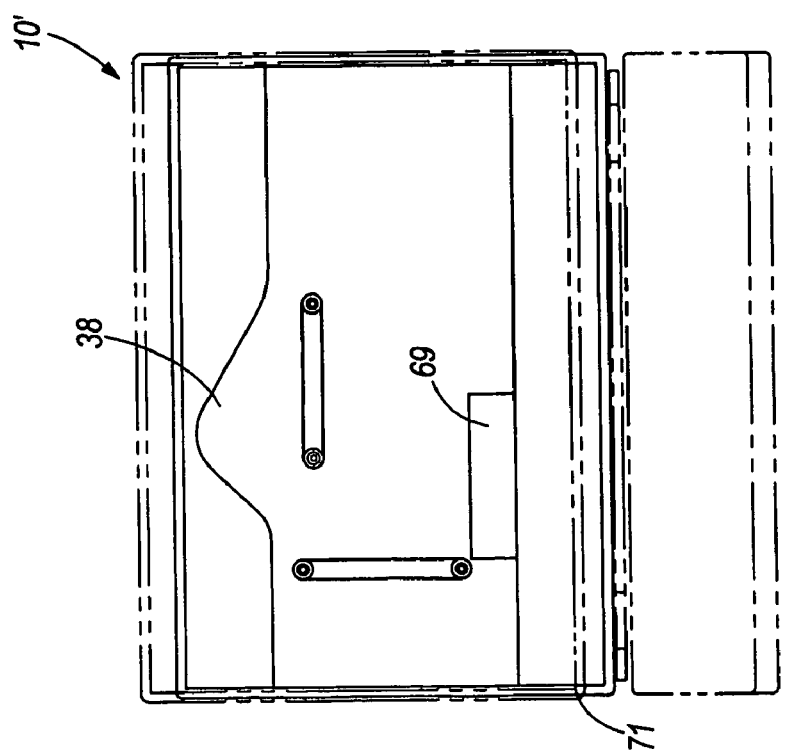
Figure 11C:
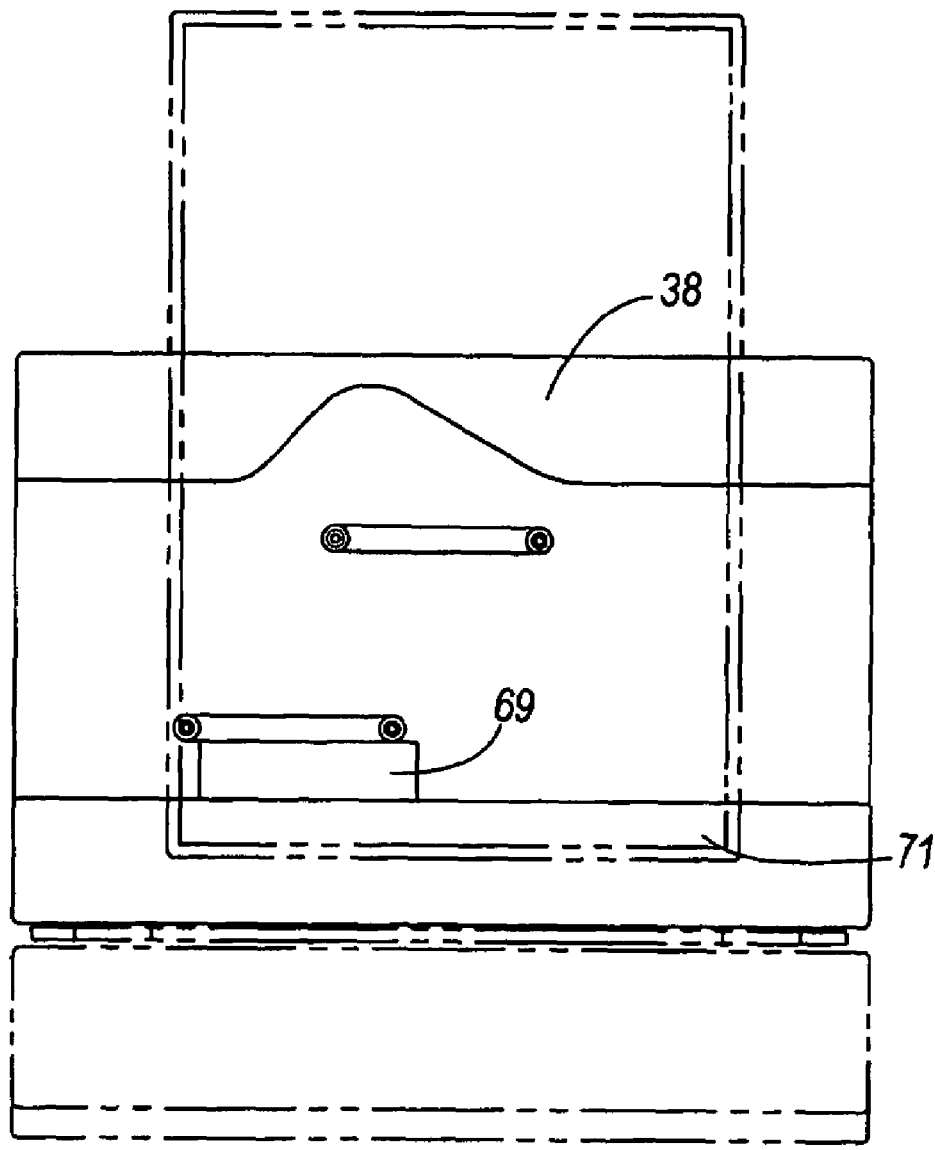

In some embodiments, the links 39, 41 can abut one or more stops positioned on the chassis 38 and/or on the screen backing 26 to control the end rotational positions of the display screen 24. Such stops can be used in addition to or instead of side walls of recessed areas as described above. For example, the links 39, 41 can be arranged so that they are not positioned within a recessed area limiting the amount of movement of the links 39, 41. In such cases, one or more projections (e.g., ribs, pins, and the like) extending from the chassis 38 and/or the screen backing 26 can be provided to define the rotational limits of the links 39, 41. FIGS. 11A–C illustrate one embodiment in which such a projection (e.g., a block-shaped projection 69 extending from the chassis 38) is employed.

As illustrated in FIGS. 7A–C, the relative positions of the links 39, 41 with respect to each other, the screen backing 26, and the chassis 38 can determine the display screen's path of movement. In some embodiments, a particular path of the display screen 24 is selected for one or more reasons, such as a path that results in a desired range of screen movement, a path that limits movement of one or more portions of the display screen 24, and the like. For example, in a laptop computer, it may be desirable to keep lower corners of the display screen 24 from dropping substantially below an initial vertical position of the corners when the display screen 24 is rotated. If one of the corners drops substantially below the initial vertical position during rotation, clearance might otherwise have to be provided between the display screen 24 and the base 14 (or other elements) in order to allow unobstructed movement of the display screen 24 from one orientation to another. This clearance can come at the cost of making the display screen 24 smaller and/or the screen housing 36 larger.

The arrangement of the links 39, 41 in FIGS. 7A–C prevents a lower corner of the display screen 24 from dropping substantially below an initial vertical position when the display screen 24 is rotated from its portrait or landscape orientations. FIGS. 7A–C illustrate the movement of the display screen 24 (and screen backing 26) relative to the chassis 38 as the links 39, 41 move through their respective ranges of motion. The illustrated display screen 24 moves from a landscape orientation (FIG. 7A) to a portrait orientation (FIG. 7C) due to the movement of the links 39, 41. As illustrated in these figures, the relationship of the links 39, 41 relative to each other, the screen backing 26, and the chassis 38 causes a lower corner 71 of the display screen 24 to move horizontally from the starting position in FIG. 7A to the finish position in FIG. 7C with little change in elevation. In the illustrated embodiment of FIGS. 1–10, this corner 71 drops no more than about ⅛ of an inch below an initial vertical starting position (FIG. 7A) as it moves between landscape and portrait orientations. Although other drop amounts are possible, this corner 71 of the display screen 24 drops no more than about ¼ inch below an initial vertical starting position in some embodiments of the present invention. In other embodiments, this corner 71 of the display screen 24 drops no more than about ½ inch below an initial vertical starting position. Thus, only minimal clearance (if any) is needed for the display screen 24 to rotate from one position to another. In other embodiments, the links 36, 41 and their relative positions can be selected to provide different amounts of corner movement as desired.

As described above, in some embodiments the links 39, 41 operate with other parts of the display 12 in a manner similar to that of a four bar linkage (two bars defined by the links 39, 41 and two bars defined by portions of the chassis 38 and the display screen 24 or screen backing 26) to at least partially control movement of the display screen 24 as described above. By connecting the links 39, 41 in this manner, the instantaneous center of rotation of the display screen 24 can be located at any desired point along the travel path of the display screen 24, depending at least in part upon the lengths of the links 39, 41, their respective positions relative to one another, and their connection locations to the chassis 38 and the display screen 24 or screen backing 26. Accordingly, these features can be changed to alter the travel path followed by the display screen 24, the different rotational positions of the display screen 24, and the feel of display screen movement to a user.

FIGS. 11A–C illustrate a second relationship of the links 39, 41 relative to each other, the screen backing 26, and the chassis 38. In this arrangement, a bottom corner 71 of the display screen 24 drops substantially below an initial vertical position of the corner 71 as the display screen 24 moves between landscape and portrait orientations (see FIG. 11B). As such, increased clearance between the bottom of the display screen 24 and the base 14 (or other elements) is necessary for this embodiment.

FIGS. 6–7C and 11A–C illustrate only two possible link arrangements that enable movement of the display screen 24 from a landscape orientation to a portrait orientation. It will be appreciated that numerous other arrangements of the links 39, 41 are possible to allow movement of the display screen 24 relative to the screen housing 36 from one orientation to another. For example, the arcs traced by the links 39, 41 can be different from each other (as illustrated) or can be the same. In this regard, the first link 39 can have a greater or smaller rotational range than the second link 41. Any ratio of rotational ranges of the first and second links 39, 41 can be employed as desired. As another example, either or both links 39, 41 can rotate through a larger or smaller range in other embodiments. Additionally, although the illustrated links 39, 41 have different lengths, in some embodiments the links 39, 41 can have the same length. As yet another example, either or both links 39, 41 can pivot about positions other than the ends of the links 39, 41 as shown in the figures. Each pivot 45, 47 can therefore be located at any point along the corresponding link 39, 41. In such embodiments, one or more ends of the links 39, 41 can be used for performing other functions (e.g., providing locations to which elements can be connected, providing abutment surfaces for limiting motion of the links 39, 41, and the like). Also, in some embodiments, the pivots 45, 47 are located at different positions on the chassis 38 and with respect to the display screen 24. As illustrated above, some arrangements will be more advantageous in generating a desired type of movement of the display screen 24, such as to limit movement of one or more display screen corners, to prevent one or more lower corners from dropping substantially below an initial vertical position, and the like.

Due to the movement of the links 39, 41, some embodiments of the present invention route display wiring in a manner that prevents binding, twisting, and unnecessary wear on the wires. As used herein and in the appended claims, the terms "wiring" and "wire" refer interchangeably to any electrical power or communications lines of any type, including without limitation cable of all types (ribbon cable, coaxial cable, and the like), one or more strands of wire, flex circuits, and the like). In the illustrated embodiment of FIGS. 1–10 (and with particular reference to FIG. 9), wiring 73 extends between the display screen 24 and the screen housing 36. This wiring 73 is positioned along the chassis 38 beginning at a hinge 22 (see FIGS. 7A–8). From the hinge 22, the wiring 73 passes around and above the recessed area 57 for the second link 41. The wiring 73 is then routed around a projection 61 to provide controlled slack for the wiring 73. The slack can be necessary to accommodate additional wire in some positions of the display screen 24. Next, the wiring 73 is routed between the two recessed areas 55, 57 and around a portion of the perimeter of the recessed area 55 for the first link 39. The wiring 73 then passes from the chassis 38 and into an aperture in the screen backing 26.

The wire routing provided herein is only one example of many possible wiring routes. Thus, although wiring can be routed around the recesses in which the links 39, 41 rotate or around the paths through which the links 39, 41 rotate, in other embodiments the wiring can be routed in different ways to avoid pinching, twisting, binding, and the like.

Figure 12C:
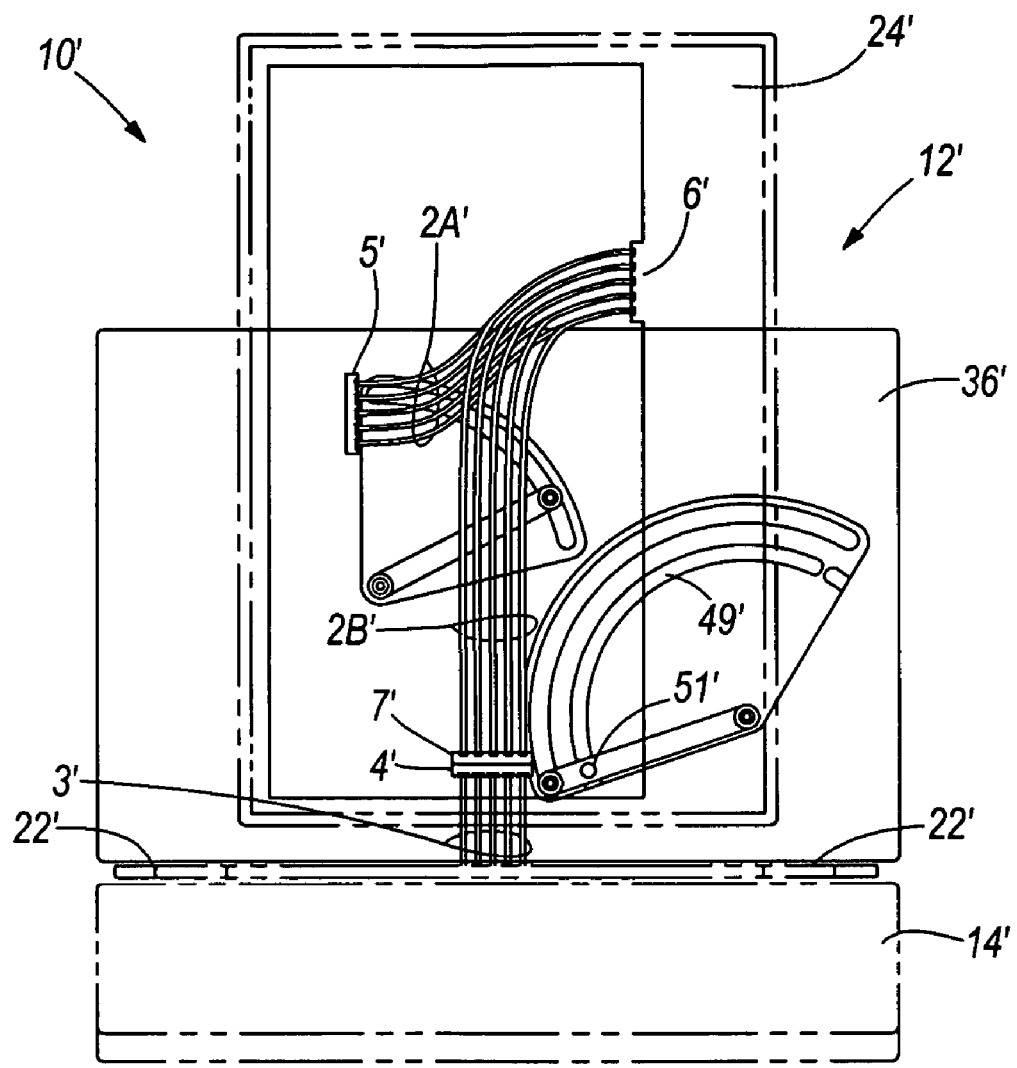

FIGS. 12A–C illustrate an alternative display screen wiring arrangement according to an embodiment of the present invention. With the exception of the different wiring and electrical connections of the display screen 24' illustrated in FIGS. 12A–C, the display 12' of FIGS. 12A–12C is substantially the same as that shown in FIGS. 1–10. Accordingly, reference numbers in the embodiment of FIGS. 12A–C are provided with a single prime. In the embodiment of the present invention illustrated in FIGS. 12A–C, the display screen 24' is releasably electrically coupled to one or more electrical interfaces in different rotational positions of the display screen 24'. For example, the screen housing 36' or computer base 14' can have one or more electrical interfaces 4' for releasable electrical connection to the display screen 24' (in the illustrated embodiment of FIGS. 12A–C, a single electrical interface is located on the screen housing 36'). The electrical interface 4' can be defined by any releasable electrical connector, such as a plurality of pins, sockets, traces, contacts, and the like. In some embodiments, the electrical interface 4' is electrically coupled to the rest of the computer 10' by suitable wiring 3', such as wiring 3' extending through one or more hinges 22' as described above.

The display 12' is also provided with wiring 2A', 2B' extending from a location 6' at which the wiring 2A', 2B' is permanently or releasably connected to the display screen 24' to electrical interfaces 5', 7' located at different positions with respect to the display screen 24'. In some embodiments, these electrical interfaces are located at different edges or corners of the display screen 24', while in other embodiments (see FIGS. 12A–C), these electrical interfaces are located in positions removed from the edges and/or corners of the display screen 24'. The display screen electrical interfaces 5', 7' can take any of the forms described above with reference to the electrical interface 4' on the screen housing 36' or computer base 14'.

The display screen electrical interfaces 5' and 7' can selectively engage interface 4' in the landscape and portrait orientations, respectively, to provide power and/or communications to the electronics of the display screen 24'. In some embodiments, the display screen interfaces 5', 7' are different from one another in one or more manners so that the computer can automatically determine the orientation of the display screen 24' by detecting the type of electrical connection to the display screen 24' (i.e., which electrical interface 5', 7' is electrically connected as described above). In some embodiments, the display screen electrical interfaces 5' and 7' do not connect with interface 4' simultaneously. Instead, one of the display screen electrical interfaces 5', 7' is disconnected via rotation of the display screen 24' relative to the screen housing 36' for the other display screen electrical interface 7', 5' to be connected.

The operation of the embodiment illustrated in FIGS. 12A–C will now be discussed. Beginning with the landscape orientation illustrated in FIG. 12A, wiring 3' is connected with wiring 2A' via a connection of electrical interface 4' with electrical interface 5'. This connection allows for electrical power and/or electrical communication between the electronics of the computer 10' and the electronics of the display screen 24'.

The display screen 24' in FIGS. 12A–C can be rotated between a landscape orientation illustrated in FIG. 12A and a portrait orientation illustrated in FIG. 12C. For example, once rotation is initiated from the landscape position shown in FIG. 12A, the display screen electrical interface 5' is separated from electrical interface 4' as illustrated in FIG. 12B, which momentarily interrupts power and/or electrical communication between the computer 10' and the display screen 24'. When rotation from the landscape orientation to the portrait orientation is completed, the electrical interface 4' connects with display screen electrical interface 7' to re-establish communication between the electronics of the computer 10' and the electronics of the display screen 24'. Rotation of the display screen 24' back to a landscape orientation operates under similar principles.

Although a single housing or base electrical interface 4' is illustrated in FIGS. 12A–C, in other embodiments additional housing or base electrical interfaces 4' can be employed to electrically connect the display screen 24' with the computer 10'. In such cases, the same wiring (e.g., 2A' or 2B') can be employed to releasably electrically connect to the electrical interface 4' in the landscape and portrait orientations of the display screen 24' (thereby eliminating the need for two sets of wires 2A', 2B' in some embodiments).

Figure 13:
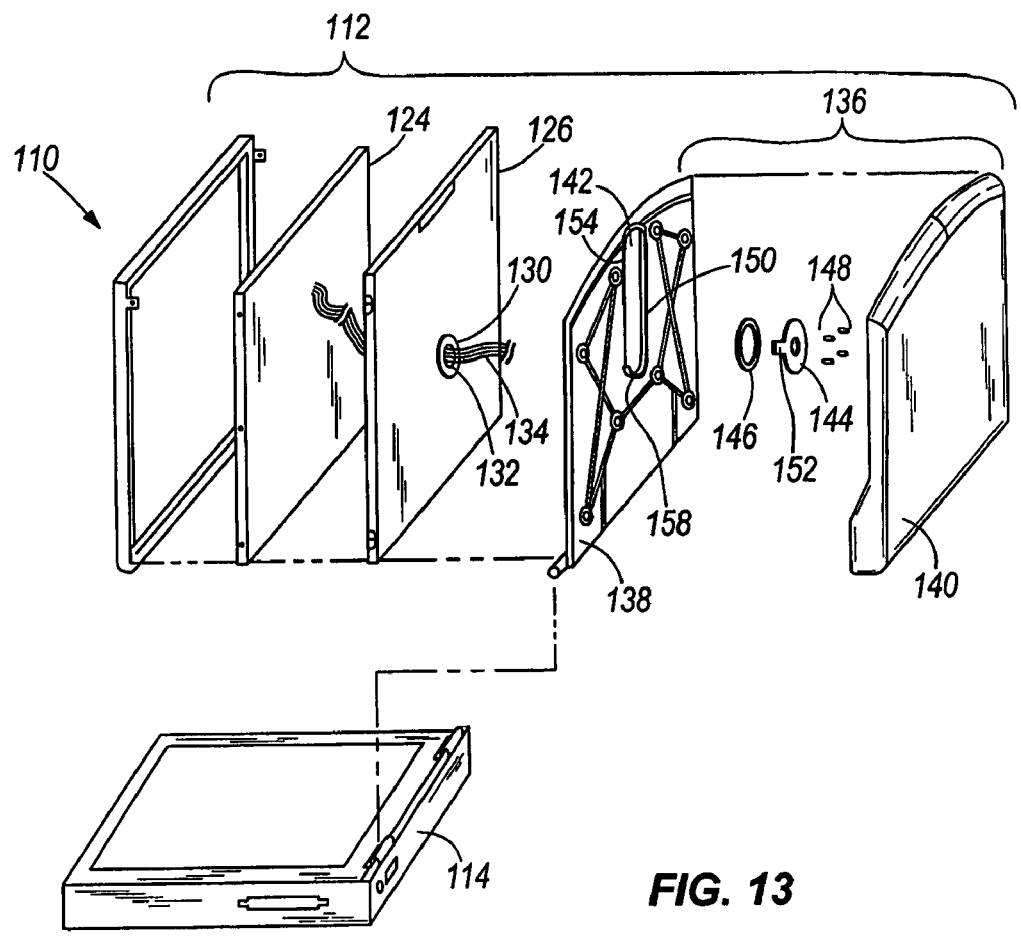
FIG. 13 is an exploded perspective view of a laptop computer having a display according to another embodiment of the present invention.

FIG. 13 illustrates another embodiment of a display moving mechanism according to the present invention. This embodiment employs much of the same structure and has many of the same operational features as the embodiments described above and illustrated in FIGS. 1–12C. Accordingly, the following description focuses primarily upon those elements and features that are different from the embodiments described above. Reference should be made to the above description for additional information regarding the elements, features, and possible alternatives to the elements and features of the display moving mechanism illustrated in FIG. 13 and described below. Elements and features of the embodiment shown in FIG. 13 that correspond to elements and features of the embodiments of FIGS. 1–12C are designated hereinafter in the 100 series of reference numbers.

As illustrated in FIG. 13, the screen backing 126 has a hub 130 extending from a rear surface thereof. The illustrated hub 130 has a generally round shape and is an extension of the screen backing 126. The hub 130 serves as the rotational member about which the display screen 124 rotates as will be described in more detail below.

The hub 130 has an aperture 132 therethrough to permit screen wiring 134 to be passed from the display screen 124 through a generally central position behind the display screen 124. Although one centrally disposed aperture 132 in the hub 130 is illustrated, any number of apertures passed through any location in the hub 130 for running the screen wiring 134 from the display screen 124 to the screen housing 136 (described below) can be used. Also, the aperture(s) can be eccentric with respect to the rotational axis of the display screen 124 rather than being centrally disposed as mentioned above. To reduce the chances of the screen wiring 134 binding within the aperture 132, the aperture 132 can be round or rounded. The aperture 132 can instead be virtually any shape desired (including without limitation square, rectangular, slit-shaped, oval, polygonal, and the like).

The hub 130 of the screen backing 126 can be generally round in shape to better enable rotation of the hub 130 within the aperture 142 of the screen housing 136. However, other hub shapes and types can instead be used which permit relative rotation between the screen backing 126 and the screen housing 136, including without limitation a hub 130 in the form of a pin, post, and/or shaft that is solid (where the screen wiring 134 is fed to the display screen 124 in another location) or that has an aperture 132 therethrough, and that has a circular, oval, square, polygonal or any other constant or varying cross sectional shape capable of being rotated within the aperture 142. In general, any extension of the screen backing 126 having any shape sized to be rotatably received (whether limited or not) within the aperture 142 of the screen housing 136 can be used as desired. Such an extension can be integral with the screen backing 126 or can be attached thereto in any manner, such as by welding, fasteners, adhesive, brazing, and the like. The term "hub" herein and in the appended claims refers to all such elements and structures.

As illustrated in FIG. 13, the display 112 can have a screen housing 136 located behind the display screen 124 and screen backing 126. The screen housing 136 has a chassis 138 and an exterior shell 140. The chassis 138 has an aperture 142 within which is received the hub 130 of the screen backing 126. The hub and aperture connection between the display screen 124 and the screen housing 136 permits relative movement between these elements as will now be described.

With reference to FIG. 13, the display screen 124 is pivotably mounted to the screen housing 136 via insertion of the hub 130 on the screen backing 126 in the aperture 142 of the screen housing 136. As illustrated, the hub 130 is slidable within the aperture 142 to permit translational movement of the display screen 124 with respect to the screen housing 136. For this purpose, the aperture 142 in the chassis 138 of the screen housing 136 is elongated and permits the hub 130 to slide therealong.

The relationship between the hub 130 and the aperture 142 of the screen housing 136 at least partially determines how the display screen 124 reacts when moved by a user through its various positions. The display screen 124 is rotatable and/or slidable with respect to the screen housing 136 to place the display screen 124 in multiple positions and/or orientations with respect to the screen housing 136. As such, the position and orientation of the aperture 142 in the screen housing 136 determines in what direction the screen 124 can be slid with respect to the screen housing 136. For example (and with regard to the laptop computer display 112 moved to a substantially vertical position), the aperture 142 can be oriented horizontally for horizontal sliding of the screen 124, can be oriented diagonally for horizontal and vertical sliding of the screen 124, and the like. Although any aperture orientation can be used in the present invention to accomplish any desired sliding movement of the display screen 124 with respect to the screen housing 136, the illustrated aperture 142 is oriented substantially vertically to permit rotation of the display screen 124 as will be described below.

To attach the display screen 124 to the screen housing 136, the hub 130 of the illustrated screen backing 126 is secured in the aperture 142 against removal therefrom. In some embodiments of the present invention, a plate 144 is attached to the hub 130 and is at least partially located behind the chassis 138 of the screen housing 136. The plate 144 can be attached to an end of the hub 130 in any manner, such as by welding, gluing, brazing, soldering, keying, press-fitting, crimping, inter-engaging teeth or bumps, mating threads on the exterior of the hub 130 and interior of the plate 144, one or more pins, posts, or protrusions on the hub 130 and/or the plate 144 releasably engaging within grooves, detents, slots, or recesses within the plate 144 and/or hub 130, respectively, and the like. Additionally, the plate 144 can be attached to the end of the hub 130 by other fasteners, such as one or more screws, rivets, bolts, pins, and the like.

Although the illustrated plate 144 is substantially round, it can take any shape that is larger than the aperture 142 to prevent removal of the display screen 124 from the screen housing 136. For example, the plate 144 can be a cap, knob, flange, or other element attached to the hub 130. In some embodiments, the plate 144 can even be integral with the hub 130, thereby defining a flared, bent, angled or otherwise enlarged hub end preventing removal of the hub 130 from the aperture 142. Of course, the shape of the hub end or plate 144 needed to prevent removal of the hub 130 from the aperture 142 can be at least partially dependent upon whether the hub 130 is rotatable within the aperture 142 of the screen housing 136. As such, if the hub 130 is not rotatable (described below), the plate 144 can be replaced by a pin, post, tab, or other extension extending radially away from the hub 130 to a position behind the chassis 138 of the screen housing 136. In short, the hub 130 can be trapped within the aperture 142 of the screen housing 136 by an extension of the hub 130 located at least partially behind a portion of the screen housing 136 or an element attached to the hub 130 located at least partially behind a portion of the screen housing 136.

An increased amount of user control over the position and orientation of the display screen 124 can be achieved in some embodiments of the present invention. For example, the display screen 124 illustrated in FIG. 13 can be movable through a range of different sliding positions and a range of different rotational orientations with respect to the screen housing 136. In some embodiments, the display screen 124 can be held in a number of places within these ranges to permit a user to locate the display screen 124 as desired. One or more features can be used to achieve additional control over the position and/or orientation of the display screen 124. Also, one or more features can be employed to increase the stability of the display screen 124 and display screen movement. Such features will be discussed below.

Some embodiments employ at least one gasket 146 located between a portion of the screen backing 126 and a portion of the screen housing 136 to control the position of the display screen 124. In the illustrated embodiment of FIG. 13, the gasket 146 is annular in shape, is fitted about the hub 130 of the screen backing 126, and is located between the chassis 138 of the screen housing 136 (near the aperture 142) and the clamp plate 144. To hold the display screen 124 in a number of different positions and orientations as just described, the gasket 146 is compressed by the clamp plate 144 against the area of the chassis 138 adjacent to the aperture 142. The clamp plate 144 thereby acts as a compression member or element against the gasket 146, which is frictionally engaged against the chassis 138. By pressing the gasket 146 in this manner, frictional force between the gasket 146 and the chassis 138 of the screen housing 136 prevents screen slippage. The compression of the gasket 146 can be sufficient to prevent such slippage, yet it can be overcome by a user grasping and pulling, pushing, or rotating the display screen 124.

In the embodiment shown in FIG. 13, the gasket 146 is attached to the hub 130 (and thereby to the screen backing 126 and display screen 124) by being located around the hub 130 and held thereon by the clamp plate 144. In this embodiment, the gasket 146 moves with the hub 130, screen backing 126, and display screen 124 when a user moves the display screen 124. It should be noted that the gasket 146 can take a number of different shapes and forms and be located in a number of different locations on or in the display 112 to accomplish the same functions described above. For example, the gasket 146 can be attached to the screen housing 136 so that the gasket 136 does not move with the display screen 124, screen backing 126, and hub 130. Specifically, the gasket 146 can line and/or be located around the aperture 142 in the screen housing 136 so that a light compression exists between the hub 130 and the gasket 146. Such a gasket can take the form of elongated strips on the inside walls of the aperture 142 or on the edges thereof, an oval or elongated loop of gasket material in the same locations, etc. Alternatively, the gasket 146 can be attached to the clamp plate 144 in any manner (e.g., by adhesive or cohesive, one or more fasteners, and the like) for compression against the chassis 138 of the screen housing 136. The gasket 146 can instead be attached to the outer surface of the hub 130 in any manner. The gasket 146 can even be part of, or integral with, the clamp plate 144 or hub 130. Multiple gaskets can also be used, if desired, and can be located in any of the positions just described. In each of the embodiments just described, a gasket 146 is compressed between the chassis 138 of the screen housing 136 and clamp plate 144 or between the chassis 138 of the screen housing 136 and the hub 130 to frictionally engage at least one of the screen housing 136, the clamp plate 144, the chassis 138, and the hub 130.

It will be appreciated by one having ordinary skill in the art that the gasket 146 can be located between any element movable with the display screen 124 and any other element stationary with respect to the screen housing 136 to accomplish the same position and orientation-holding functions described above. For example, the gasket 146 can be attached to the chassis 138 of the screen housing 136 in a location adjacent to the aperture 142 and between the screen backing 126 and the chassis 138. The gasket 146 is therefore lightly compressed and can provide frictional holding engagement between the screen backing 126 and the chassis 138 of the screen housing 136. As another example, the gasket 146 can be attached to the screen backing 126 (for example in a location where it remains in contact with the chassis 138 of the screen housing 136 in the display screen's full range of motion) in any manner. Once again, the gasket 146 is therefore lightly compressed and can provide frictional holding engagement between the screen backing 126 and the chassis 138 of the screen housing 136. Still other gasket locations are possible and fall within the spirit and scope of the present invention.

Because the amount of gasket compression at least partially determines the amount of force required by the user to shift or rotate the display screen 124, some embodiments of the present invention permit gasket compression adjustment. Compression upon the gasket 146 can be set by the tightness of the fasteners used to hold the gasket 146 in place upon the hub 130. For example, the fasteners 148 can be screws exerting a varying compressive force by the clamp plate 144 by their degree of tightness, or can be rivets having a length selected to exert a desired amount of compression upon the gasket 146 by the clamp plate 144. As another example, the gasket 146 of the illustrated embodiment can be compressed to a desired degree by a clamp plate 144 threaded upon the hub 130 and turned a desired amount to compress the gasket 146 against the chassis 138 of the screen housing 136. In other gasket embodiments such as those described above, the gasket 146 can be compressed by drawing the screen 124 closer to the chassis 138 of the screen housing 136. For example, the hub 130 can be received within the aperture 142 of the screen housing 136 with a desired pre-load to thereby compress a gasket located between the screen backing 126 and the chassis 138 of the screen housing 136, or the clamp plate 144 can be tightened to draw the hub 130 through the aperture 142 and toward the screen housing 136 for a similar result.

The gasket compression selected can be non-adjustable (such as a desired factory-selected compression used during assembly of the display 112) or adjustable by a user as desired. Permitting adjustability of gasket compression permits a user to adjust the "stiffness" of the display screen 124 to his or her preference, can allow a user to fix the display screen 124 in a desired position or orientation such that further display screen movement can only be accomplished by loosening gasket compression, and permits adjustment for gasket wear.

It should be noted that the round gasket shape illustrated in the figures is only one of several gasket shapes that can be used in the present invention. The particular shape selected for any given embodiment depends at least partially upon the gasket location (e.g., around the hub 130, lining the aperture 142, attached to the screen backing 126 or chassis 138, etc.). For example, the gasket 126 can be one or more belts, strips, blocks, bumps, ribs, wedges, or any other shapes attached to their associated element(s) in any manner, including without limitation gluing, fastening with fasteners, recessed within mating receptacle(s), and the like. All such elements fall within the meaning of the term "gasket" as used herein and in the appended claims.

The clamp plate 144 and gasket 146 can be made of any rigid or substantially rigid material desired, including without limitation plastic, metal (e.g., aluminum, steel, etc.), composites, or combinations thereof. In some embodiments, the gasket 146 is made from a low-wear material such as Teflon® or engineered plastic.

It can be desirable to limit rotation of the display screen 124 in one or more display screen positions. As such, some embodiments of the present invention employ a connection between the display screen 124 and the screen housing 136 that limits display screen rotation. With reference to FIG. 13, a stop member 150 is positioned adjacent to the aperture 142 in the chassis 138 of the screen housing 136. Although the stop member 150 can take a number of different forms as described below, the stop member 150 can take the form of a lip, such as that shown in FIG. 13. The lip 150 can be integral with the chassis 138 or it can be a separate element attached thereto in any manner. For reasons that will be described below, in some embodiments the lip 150 extends partially around the aperture 142 as shown in the figures. The clamp plate 144 can have a limit member in the form of an extension 152 extending from the clamp plate 144. The extension 152 interferes with the lip 150 in one or more sliding positions and rotational orientations of the display screen 124. As illustrated, the lip 150 extends around the upper and lower ends of the elongated aperture 142 in the chassis 138 of the screen housing 136, and also extends along one side of the elongated aperture 142. The clamp plate 144 can be oriented with respect to this lip 150 so that the lip 150 prevents full rotation of the hub 130 when the display screen 124 is rotated. This prevents the user from continuously rotating the display screen 124 in the same direction (which can eventually damage the electrical connections to the display screen 124). As will now be described, this relationship between the extension 152 and the lip 150 can also be used to prevent rotation of the display screen 124 in a particular direction.

The extension 152 of the clamp plate 144 can prevent over-rotation of the display screen 124 in either direction by contacting and being blocked by the lip 150 adjacent to the aperture 142. Particularly, the display screen 124 can only be rotated to a portrait orientation in one direction. To limit display screen rotation in this manner, the lip 150 is located to contact and block rotation of the clamp plate extension 152 once the display screen 124 has been raised sufficiently to clear rotation of the display screen's bottom corners. As shown in FIG. 13, the lip 150 has a stop portion 154 near the top of the elongated aperture 142 that prevents rotation of the clamp plate extension 152 in one direction when the display screen 124 is raised. Another stop portion 158 of the lip 150 can be useful to prevent similar rotation in applications where the display screen 124 is not blocked from rotation by its bottom corners when in its lower position.

One having ordinary skill in the art will appreciate that the clamp plate extension 152 can take a number of different forms capable of motion limiting contact with the lip 150 (or other element or structure as just described). For example, other limit members can be used in place of the clamp plate extension 152, including without limitation one or more pins, posts, ramps, teeth, ribs or other protrusions extending from the clamp plate 144 for motion limiting contact with the lip 150. The limit member(s) need not be a part of or connected to the clamp plate 144, but can instead be integral with or an element connected to the hub 130 or screen backing 126 in any manner.

While the clamp plate extension 152 or other limit member can contact and abut a stop surface connected to the chassis 138 as described above, it should be noted that other relationships between the clamp plate 144 and chassis 138 are possible. By way of example only, the edges of the aperture 142 can be shaped to permit hub rotation only in desired portions of the aperture 142. In such cases, the clamp plate extension 152 can be at least partially located within the aperture 142 and can be blocked by internal aperture wall(s) in certain portions of the aperture 142 while not being thus blocked in other portions of the aperture 142. Alternatively, the hub 142 can be square, rectangular, have flats, or otherwise be shaped to fit within certain portions of the aperture 142 without the ability to rotate therein, but can be rotatable in other (e.g., wider) portions of the aperture 142.

In alternative embodiments of the present invention, the extension and stop relationship between the display screen 124 and the chassis 138 of the screen housing 136 can even be reversed, with the hub 130 being shaped to contact and abut one or more extensions located adjacent to the aperture 142 to limit hub rotation therein. These extensions can be one or more walls, posts, arms, or other elements extending at least partially into the travel path of the hub 130 as it moves through the aperture 142, and are shaped to contact and abut one or more surfaces of the hub 130 to prevent or limit hub rotation in desired hub positions within the aperture 142. Still other elements limiting hub rotation in desired hub locations in the aperture 142 are possible and fall within the spirit and scope of the present invention.

Although the lip 150 and its stop portions 154, 158 can be used for limiting rotational movement of the hub 130 and the display screen 124 as just described, many other elements can be used to perform this same function. For example, the lip 150 can be replaced by any number of elements attached to or integral with the chassis 138 of the screen housing 136 adjacent to the aperture 142 therein, including without limitation one or more pins, posts, ramps, teeth, ribs, or other protrusions on the chassis 138 upon or against which the clamp plate extension 152 is movable to limit clamp plate movement. Such elements can be in selected locations adjacent to the aperture 142 to permit hub and screen rotation in certain hub positions in the aperture 142 and to provide limited or no hub and screen rotation in other hub positions in the aperture 142 in a manner similar to the lip shape and position described above.

As shown in FIG. 13, the screen wiring 134 is run through the hub aperture 132 (and therefore through the aperture 142 in the chassis 138 of the screen housing 136) and into the screen housing 136 via a gap in the lip 150 of the chassis 138 (between stop portions 154, 158). The gap 158 can be sufficiently long to receive the screen wiring 134 in all positions of the hub 130 in the aperture 142. In this manner, the screen wiring 134 enters a space between the chassis 138 and the shell 140 of the screen housing 136 laterally through the gap 158. The screen wiring 134 thereafter extends toward an edge of the chassis 138 and then to connected equipment, such as the base 114 of the laptop computer 110.

Also, the screen backing 126 of the illustrated embodiment encloses the back of the display screen 124, or at least substantially covers the back of the display screen 124. The screen backing 126 can be made of any material capable of shielding the display screen 124 from electromagnetic interference as is well known to those skilled in the art. As an alternative to an enclosed or substantially covered display screen back, other embodiments of the present invention can employ a screen backing 126 having other shapes and covering any desired amount of the display screen back. For example, the screen backing 126 can merely provide a structural member to which the hub 130 is attached or from which the hub 130 extends. The screen backing 126 can therefore be a strip of rigid or semi-rigid material spanning across at least part of the back of the display screen 124, a frame of wire, rods, bars, strips, and/or other elements located behind the display screen 124 and attached thereto in any manner, or even an island of rigid or semi-rigid material attached to the back of the display screen 124 in any manner (such as by adhesive, soldering, fasteners, brazing, welding, and the like) and to which the hub 130 is attached or from which the hub 130 extends.

In short, any element or structure providing sufficient support for the hub 130 to withstand stresses from display screen rotation and movement during use can be employed for the screen backing 126. This element or structure can be any shape or size capable of providing the hub 130 with such support, and can be directly or indirectly connected to the display screen 124. In this regard, if the display screen 124 is sufficiently strong to withstand the stresses of screen rotation and movement by a user, it is also possible to connect the hub 130 directly to the back of the display screen 124 in any of the manners described above with reference to the connection between the screen backing 126 and the display screen 124. In still other embodiments of the present invention, the hub 130 can even be part of the display screen 124 itself, such as a rearward extension of a casing of the display screen. It should be noted that the ability to attach the hub 130 or the screen backing 126 to a rear surface of the display screen 124 will depend in part upon the design and structure of the display screen 124, the potential exposure of screen electronics and circuitry to damaging stresses and/or heat from certain methods of attachment, etc.

The screen housing 136 described above and illustrated in the figures is adapted for a number of applications, including for laptop computer applications. However, numerous other screen housing shapes and sizes are possible, some of which do not function to "house" the display screen 124. For example, the screen housing 136 need not necessarily be a two-piece structure such as in the illustrated embodiment of the present invention shown in FIG. 13. The screen housing 136 can instead be one element of any shape and having an aperture 142 therethrough for receiving the hub 130 as described above. Alternatively, the screen housing 136 can be made of multiple elements having any desired assembled shape and size, with one or more of the elements defining the aperture 142 within which the hub 130 is received. As another example, the screen housing 136 can be a bar or post having an aperture therethrough for receiving the hub 130 as described above. The bar can be hollow to hide such elements as the gasket 146 and clamp plate 144 therein or can be solid to permit the hub 130 to pass completely therethrough. Also, the screen housing 136 need not necessarily enclose the screen wiring 134 extending through the hub aperture 132. The screen housing 136 at least provides a structure or framework upon which the hub 130 is rotatably mounted (i.e., in an aperture 142) and which is sufficiently rigid and strong to withstand the stresses of display screen rotation and movement by a user. Any element or combination of elements with these features can be used for the screen housing 136 and is encompassed by the term "screen housing" or "housing" as used herein and in the appended claims.

As indicated above, movement of the hub 130 can be limited and controlled to result in display screen movability that is significantly different from that described above and illustrated in the figures. Whereas a relatively vertical aperture 142 permitting vertical display screen travel and display screen rotation in a middle or upper range of the aperture 142 is useful for many applications such as laptop computers, other display screen mobility is also possible. For example, the aperture 142 can be oriented in any direction to permit screen movement that is other than vertical (e.g., diagonal, horizontal, etc.) as mentioned above. Also, the aperture 142 can trace a path for the hub 130 that is not straight as shown in the figures. Specifically, the aperture 142 can be bent, bowed, curved, angled, and/or otherwise have two or more segments running in different directions. The aperture 142 can even have one or more forked portions permitting the hub 130 and the display screen 124 to be moved by the user through one or more different paths and into different positions therein. Such alternative apertures 142 are used to enable hub and display screen movement through a path that is straight, bent, curved or has a combination of such features. Regardless of the size, shape, and orientation of the aperture used in any particular embodiment of the present invention, rotation of the hub 130 can be limited in any manner described above in any portion or portions of the aperture 142. The hub 130 can even be freely rotatable in all positions within the aperture 142 or can be partially and/or entirely limited from rotation in all positions within the aperture 142 as desired. Similarly, the aperture 142 can be shaped to permit only full or limited hub rotation (without any hub translation). All such aperture shapes, sizes, and orientations fall within the spirit and scope of the present invention.

Figure 14A:
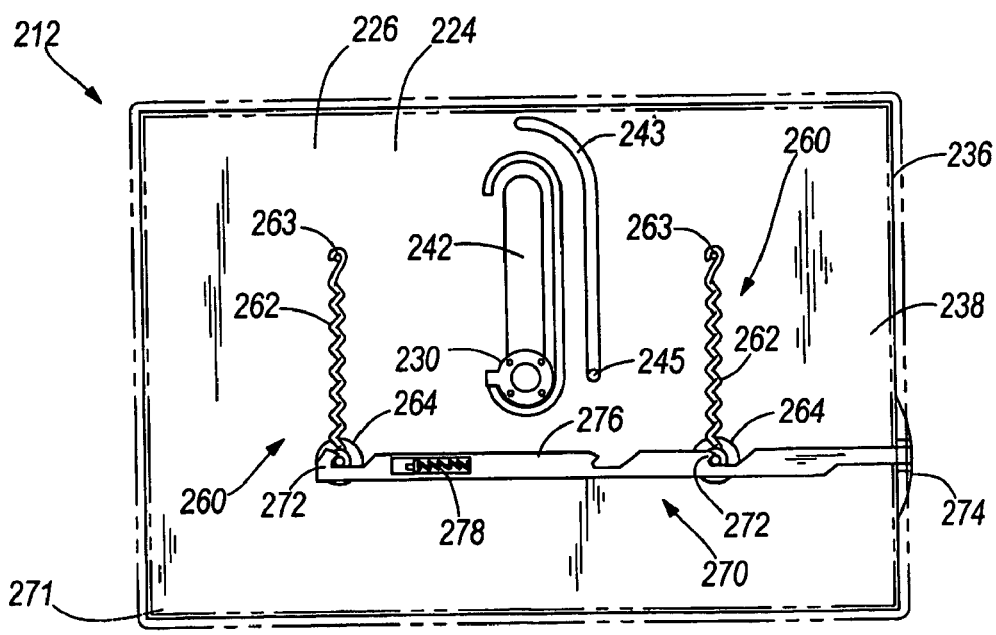
FIG. 14A–14C are front views of another alternative embodiment of a display according to the present invention, shown with the display screen and screen backing in phantom and in different stages of movement between landscape and portrait orientations.
Figure 14B:
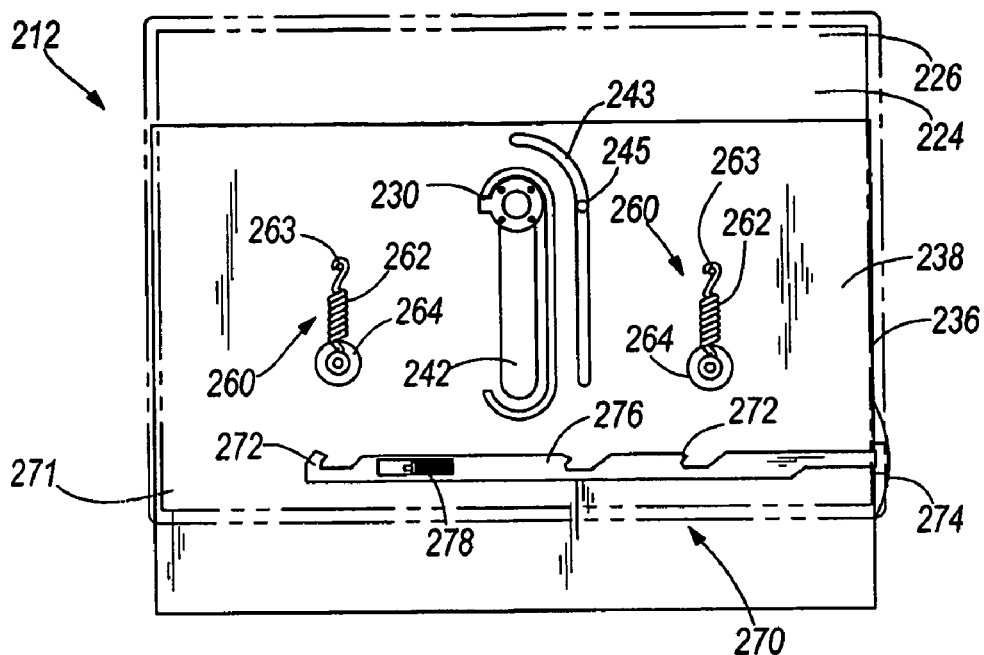
Figure 14C:
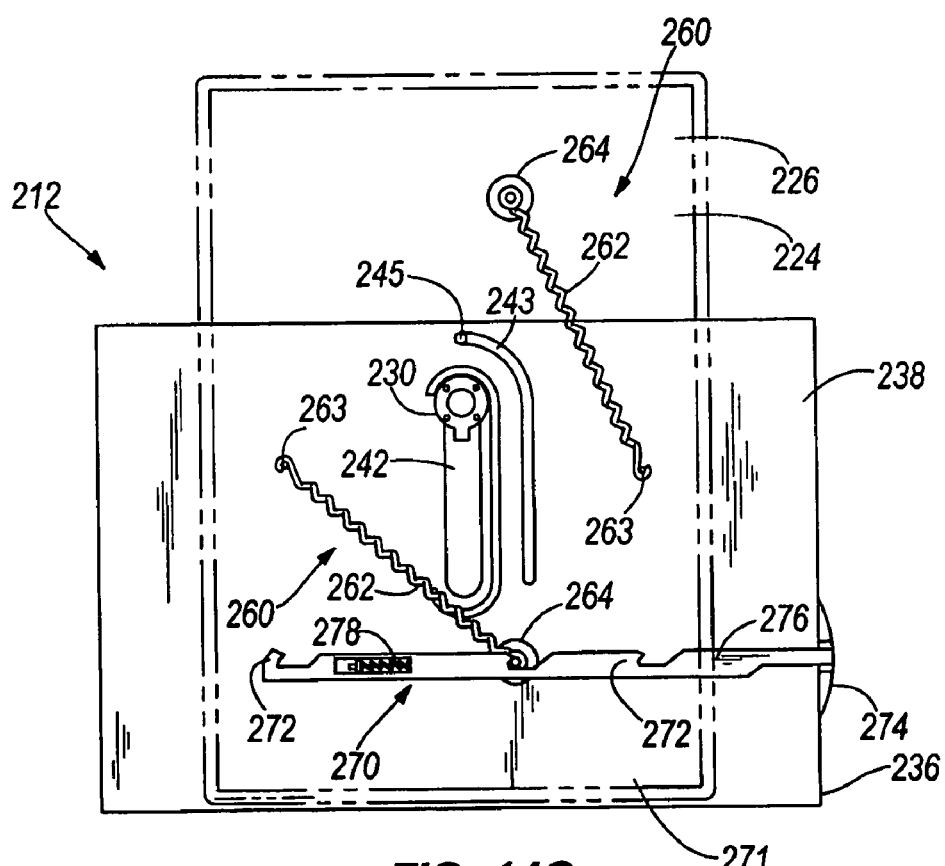

FIGS. 14A–C illustrate another embodiment of a display 212 according to the present invention. This embodiment employs much of the same structure and has many of the same operational features as the embodiments described above and illustrated in FIGS. 1–13. Accordingly, the following description focuses primarily upon those elements and features that are different from the embodiments described above. Reference should be made to the above description for additional information regarding the elements, features, and possible alternatives to the elements and features of the display 212 illustrated in FIGS. 14A–C and described below. Elements and features of the embodiment shown in FIGS. 14A–C that correspond to elements and features of the embodiments of FIGS. 1–13 are designated hereinafter in the 200 series of reference numbers.

Referring to FIGS. 14A–C, it can be seen that some embodiments incorporate a second aperture 243 positioned adjacent a primary aperture 242. A projecting member 245, such as a pin, extends from the screen backing 226 and is received within the second aperture 243. As the display screen 224 is moved from one position to another (e.g., landscape to portrait, or portrait to landscape), the pin 245 moves within the second aperture 243 and is guided by the walls defining the second aperture 243. This second aperture 243 can be used to control the position in which the display screen 224 can begin rotating. For example, as illustrated in FIGS. 14A–C, the display screen 224 cannot begin to rotate until the display screen 224 has been translated from the lower rest position (FIG. 14A) to the upper position (FIG. 14B).

As illustrated in FIG. 14A–C, in some embodiments the second aperture 243 generally follows a portion of the perimeter contour of the primary aperture 242. With reference to the embodiment of FIGS. 14A–C by way of example only, the second aperture 243 can have a substantially straight elongated portion that follows the substantially straight elongated portion of the primary aperture 242, while the upper end of the second aperture 243 curves to follow the top curve of the primary aperture 243.

During operation of the embodiment illustrated in FIGS. 14A–C, the projection 245 follows the second aperture 243 to control the position of the display screen 224. Specifically, the engagement of the projection 245 with the second aperture 243 prevents rotation of the display screen 224 until the translation is substantially complete.

The use of a second aperture 243 and projection 245 can add stability to the display 212. In particular, a projection 245 can help limit or eliminate undesirable movement of the display screen 224 with respect to the chassis 238. For example, the projection 245 and second aperture 243 can limit movement of the display screen 224 in the plane of the display screen 224 to a path between landscape and portrait orientations as described above. As another example, the projection 245 and second aperture 243 can limit movement of the display screen 224 toward and/or away from the chassis 238. In this latter case, the projection 245 can take any shape, can have any feature (one or more flanges, enlarged portions, and the like), and can be connected to any element (e.g., washers, radially extending pins or fingers, and the like) limiting movement of the projection 245 in either axial direction of the projection 245 in the second aperture 243. In this regard, the description accompanying the embodiment of FIGS. 1–10 above regarding limiting motion of the link pivots 45, 47 in the arcuate apertures 43 applies equally here with regard to the projection 245 in the second aperture 243.

FIGS. 14A–C illustrate an example of an aperture and projection connection. In other embodiments, the location of the projection 245 and aperture 243 can be different. For example, the projection 245 can be positioned closer or farther away from the hub 230. Furthermore, the projection 245 can be positioned at a different angular relationship relative to the hub 230. In the embodiment illustrated in FIGS. 14A–C, the projection 245 is positioned about ninety degrees from vertical relative to the center of the hub 230 when the display screen 224 is in the landscape position. Other positional relationships between the projection 245 and the hub 230 are possible while still performing the same functions described above.

Figure 15:
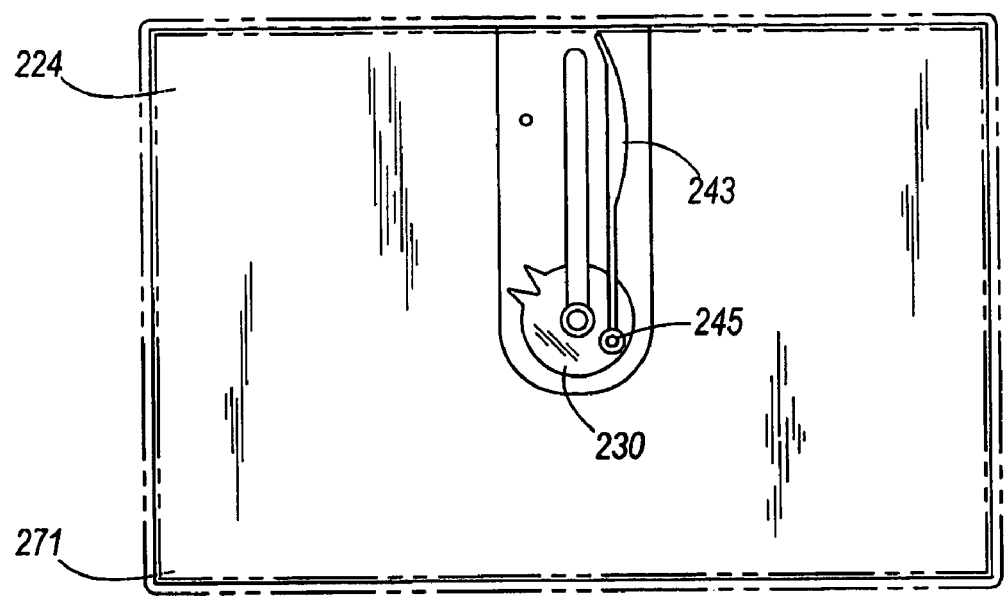
FIG. 15 is a front view of another alternative embodiment of a display according to the present invention, shown with the display screen and screen backing in phantom and in a landscape orientation.

Note that the relative position of the projection 245 with respect to the center of the hub 230, as well as the desired height in which rotation can begin can affect the shape of the guiding aperture 243. For example, FIG. 15 illustrates an embodiment having an alternative linking arrangement. As illustrated, the projection 245 is positioned at a different angular position relative to the center of the hub 230, and in which the initial rotation position is lower relative to the embodiment shown in FIGS. 14A–C. By changing the shape of the second aperture 243 to that shown in FIG. 15, the display screen 224 can rotate at a lower elevation in the embodiment of FIG. 15. In this embodiment, the second aperture 243 allows rotation to begin once the display screen 224 has been lifted to a sufficient height such that the bottom corner 271 of the display screen 224 will not interfere with the base of the computer (not shown). Specifically, the second aperture 243 widens once the display screen 224 is lifted about halfway up, thereby allowing rotation to begin. The second aperture 243 continues to widen to allow further rotation of the display screen 224 as the display screen 224 is lifted further, and can then narrow to allow for additional height adjustment, if desired, above the widened portion where rotation is allowed.

In some embodiments, the relationship between the projection 245 and the second aperture 243 can be reversed. For example, the second projection 245 can be located on the chassis 238 for being received within and along a second aperture 243 in the screen backing 226.

Returning to FIGS. 14A–C a bias assembly 260 is also illustrated. The bias assembly 260 has one or more bias elements positioned to move the display screen 224 from one position to another upon release of the potential energy stored within the bias element(s). Specifically, one or more springs 262 are positioned to move the display screen 224 from the lower landscape position illustrated in FIG. 14A to the upper landscape position illustrated in FIG. 14B. The illustrated springs 262 are shown in tension in FIG. 14A. However, in other embodiments, the springs 262 can be compression springs. In such embodiments, the compression springs can be positioned to be compressed while the display screen 224 is in the lower position. The stored potential energy could then be used to bias the display screen 224 (e.g., lift the display screen 224 in some embodiments) to the position shown in FIG. 14B. In still other embodiments, springs are not used at all. Rather, other potential energy storing devices can be used to aid movement of the display screen 224. For example, the attraction and repulsion of magnets can be used to aid display screen movement, if desired. As another example, one or more elastic bands or other elements can be employed as an alternative to springs.

The illustrated bias assembly 260 also has a pair of projections 264 extending from the screen backing 226. A spring 262 is coupled to each of the projections 264, and is also coupled to the chassis 238 or screen housing 236. In the illustrated embodiment of FIGS. 14A–C, each spring 262 is coupled at one end to a projection extending from the screen backing 226, and at an opposite end to a projection 263 extending from the chassis 238 or other portion of the screen housing 236. In other embodiments, the ends of the springs 262 can be connected to any other element or feature of the screen backing 226 (or display screen 224) and to any other element or feature of the chassis 238 or screen housing 236. Such features and elements include without limitation hubs, posts, lugs, bosses, lips, apertures, and the like.

After the display screen 224 has been lifted as described above, the display screen 224 can be rotated to the portrait position as also described above. In doing so, the springs 262 of the bias assembly 260 can again be stretched until the display screen 224 has been rotated to the portrait position. Depending at least in part upon the strength of the springs 262, and the locations of the projections 263, 264, the springs 262 can exert a force urging the display screen 224 back to the position illustrated in FIG. 14B. The display screen 224 can be restrained from this motion in a number of different manners, such as by one or more latches releasably coupling the display screen 224 with respect to the screen housing 236 when the display screen 224 is in the portrait orientation. In the illustrated embodiment of FIG. 14A–C, for example, a locking device (described in greater detail below) is used to releasably secure one of the projections 264 in place when the display screen 224 is rotated to the portrait orientation.

Although the illustrated embodiment of FIGS. 14A–C uses two bias assemblies 260, (e.g., two springs 262 coupled to projections 264, 263 extending from the screen backing 226 and chassis 238 as described above), other embodiments can incorporate more or fewer bias assemblies 260 or other bias elements. For example, in some embodiments, only one spring 262 (connected as described above) is used to bias the display screen 224. In other embodiments, additional springs 262 can be connected in a similar manner as desired. As another example, in some embodiments, a spring can be connected between the chassis 238 and the hub 230 to bias the display screen 224, and in some embodiments to offset torques created by one or more other springs 262. Any number of bias elements 262 can be connected to bias the display screen 224 toward a desired position.

Some embodiments of the present invention employ a locking device to hold or at least help retain the display 212 in at least one position or orientation. By way of example only, the display embodiment illustrated in FIGS. 14A–C has a locking device (indicated generally at 270). Upon release of the locking device 270, the display screen 224 is free to move to other positions or orientations. An example of a locking device 270 according to the present invention is shown in FIGS. 14A–C. The locking device 270 in FIGS. 14A–C is employed to hold the display screen 224 in a lower landscape position and to hold the display screen 224 in a portrait position. However, in other embodiments, the locking device 270 can be used to hold the display screen 224 in different positions. For example, the locking device 270 could be used to lock the display 212 in any position between a landscape position and a portrait position.

The locking device 270 has at least one catch 272 positioned to engage a projection 264 extending from the screen backing 226 or display screen 224 (described above). The illustrated exemplary catches 272 engage both projections 264 to prevent translation of the secondary hubs 264 when the display screen 224 is in a landscape orientation as shown in FIG. 14A. In the illustrated embodiment of FIGS. 14A–C, the catches 272 of the locking device 270 engage the projections 264 while the projections 264 are in their lower landscape positions. By engaging the projections 264 in this position of the display screen 224, the locking device 270 stores potential energy in the bias assembly 260. Upon release of the locking device 270, the stored potential energy is released, which causes the projections 264 to move relative to the chassis 238.

In the illustrated embodiment of FIGS. 14A–C, two catches 272 are defined on a rod 276 that can be shifted into and out of engagement with the projections 264 (although fewer or more catches 272 on the rod 276 can be employed as desired). Other elements and mechanisms can also be employed to releasably engage the projections 264. For example, a rotating lever can catch and restrain movement of one or more projections 264. As another example, an external latch can extend between the screen housing 236 and the display screen 224 to prevent relative movement of the two while secured by the external latch. Upon release of the external latch, movement of the display screen 224 with respect to the screen housing 236 is enabled.

Although the locking device 270 is illustrated as engaging the projections 264, the locking device 270 can releasably engage any feature of or coupled to the display screen 224 or screen backing 226 for holding the display screen 224 in place with respect to the screen housing 236. For example, the locking device 270 can engage the links 39, 41, pivots 45, 47, hub 130, or other elements described in the previous embodiments. As another example, one or more posts, fingers, apertures, or other features or elements on the display screen 224 or screen backing 226 can be releasably engaged with a locking device 270 coupled to the chassis 238 or other part of the screen housing 236 in order to prevent movement of the display screen 224 with respect to the screen housing 236. Such releasable engagement can be provided by pivoting, sliding, or moving the locking device 270 in any other manner into engagement with such elements on the display screen 224 or screen backing 226. In still other embodiments, the locking device 270 is mounted to the display screen 224 or display screen backing 226, and can be moved in any of the manners described above to releasably engage an element or feature on the chassis 238 or other part of the housing 236. Any of the elements or features described above (with reference to engagement with a locking device 270) can be employed for this purpose.

The locking device 270 can be disengaged from the projections 264 by a manual or powered actuator. For example, in the embodiment of FIGS. 14A–C, a user-manipulatable control 274 is located on the side of the display 212 and is accessible for user actuation. The user-manipulatable control 274 is coupled to the rod 276, which is coupled to or otherwise includes the catches 272. The rod 276 can be biased to engage the projections 264 by one or more springs 278. In the illustrated embodiment of FIGS. 14A–C for example, one or more springs 278 can be positioned between the chassis 238 or other part of the screen housing 236 and the rod 276. By pushing the user-manipulatable control 274 against the biasing force of the spring 278, the rod 276 can be moved to disengage the projections 264, which allows the projections 264 to move. In other embodiments, the user-manipulatable control can be a lever, slide, or other element connected to the locking device 270 for actuation into and out of latched relationship with the projections 264.

When the display screen 224 is rotated to a portrait orientation as described above, one of the projections 264 can be releasably engaged with one of the catches 272 used to secure the display screen 224 in a landscape orientation as described above, or can be releasably engaged with another catch 272 coupled to or defined by the rod 276 as shown in FIG. 14C. Release of the projection 264 in the portrait orientation of the display screen 224 can be performed in the same manner as described above regarding release of the projections 264 in the landscape orientation.

Although the illustrated locking device 270 utilizes a non-powered mechanical actuator, other embodiments of the present invention can have powered actuators actuate the locking device 270. For example, one or more solenoids can be used to move the rod 276 to release the display screen 224 for movement. In other embodiments, one or more solenoids can directly and releasably engage the projections 264 in order to control the ability of the projections 264 (and therefore, the display screen 224) to move. As another example, one or more translatable and/or pivotable levers can be driven by a solenoid into and out of engagement with the projections 264 to prevent relative movement of the display screen 224 with respect to the screen housing 236. As described above, the locking device 270 can releasably engage other features and elements of the screen backing 226 or display screen 224 (or can releasably engage features and elements of the chassis 238 or other parts of the screen housing 236 in cases where the locking device 270 is connected to the screen backing 226 or display screen 224).

Although a locking device 270 is shown in conjunction with a bias assembly 260 in the illustrated embodiment of FIG. 14A–C, the locking device 270 can be used independently of a bias assembly 260 in any of the embodiments disclosed herein (and vice versa). For example, it can be desirable in some embodiments to prevent movement of a non-biased display screen 224. Thus, upon release of the locking device 270, the user in such embodiments can provide the forces necessary to move the display screen 224.

Some embodiments of the present invention can employ one or more biasing elements connected to bias the display screen 224 in a rotational direction. Any type of biasing element can be employed for this purpose, including without limitation extension or compression springs or elastic members coupled to and between the display screen 224 or screen backing 226 and the screen housing 236, one or more torsion springs (for example, a torsion spring positioned about the hub 240) and connected to and between the display screen 224 or screen backing 226 and the housing 236, and the like. In the embodiment of FIGS. 14A-14C for example, the springs 262 exert a rotational force urging the display screen 224 to return to the landscape position illustrated in FIG. 14B, although the springs 262 or other biasing elements can be connected to bias the display screen 224 in any other direction desired.

With reference to FIG. 14A, the display screen 224 is shown in its landscape orientation with the hub 230 positioned at its lowest point in the elongated aperture 242 of the screen housing 236. In this position, rotation of the display screen 224 is not possible because inadequate clearance exists for a bottom corner 271 of the display screen 224 to rotate. However, the display screen 224 can be moved along elongated aperture 242 to provide such clearance. With reference to the illustrated embodiment of FIGS. 14A–C, the display screen 224 can be shifted or translated (without rotation) to an upper position as shown in FIG. 14B. Raising the display screen 224 enables rotation of the display screen 224. Specifically, the projection 245 rides in the second aperture 243 to prevent display screen rotation until the display screen 224 has adequate clearance for rotation. Although the embodiment of the present invention illustrated in FIGS. 14A–C employs display screen translation followed by rotation, it will be appreciated that in other embodiments, any part of (or all) movement of the display screen 224 can be translation, rotation, or a simultaneous combination of translation and rotation, and that different types of display screen movement can be defined at different display screen positions with respect to the screen housing 236. In the illustrated embodiment of FIGS. 14A–C, display screen movement is defined at least in part by the shape of the second aperture 243 and the relationship of the hub 230 to stops or features on the chassis 238. The location and shape of such features can be changed to define any type of display screen movement desired along the aperture 242.

As mentioned above, the display screen 224 can be moved by the bias assembly 260 shown or by forces exerted by the user. In the illustrated embodiment of FIGS. 14A–C, a user can push the button 274 to release the locking device 270. This causes the catches 272 to release the projections 264. Upon release of the projections 264, the bias force exerted on the projections 264 by the springs 262 causes the display screen 224 to translate. Upon reaching the upper position shown in FIG. 14B, the display screen 224 can be rotated from the landscape orientation to the portrait orientation (FIG. 14C).

FIGS. 16A–D illustrate another display control arrangement according to the present invention. The elements and features of this embodiment are similar in many ways to elements and features in embodiments described above and illustrated in FIGS. 1–15. Accordingly, the following description focuses primarily upon those elements and features that are different from the embodiments described above. Reference should be made to the above description for additional information regarding the elements, features, and possible alternatives to the elements and features of the display control arrangement illustrated in FIGS. 16A–D and described below. Elements and features of the embodiment shown in FIGS. 16A–D that correspond to elements and features of the embodiments of FIGS. 1–15 are designated hereinafter in the 300 series of reference numbers.

FIGS. 16A–D illustrate a display control arrangement that is similar in some aspects to the display control arrangement illustrated in FIGS. 14A–C. However, rather than provide a separate projection and aperture engagement as illustrated in FIGS. 14A–C, the embodiment of FIGS. 16A–D has engaging parts of the hub 330 and chassis 338 to control the movement and position of the display screen (not shown).

In the illustrated embodiment of FIGS. 16A–D, the hub 330 has two apertures or grooves 380, 382 positioned substantially perpendicular to one another. Each groove 380, 382 can be at least partially defined by one or more side walls 381, 383 of the hub 330, and is dimensioned to receive a rib 386. The rib 386 can extend from any part of the display housing 336, such as the chassis 338. By way of example only, the rib 386 can be a feature of the chassis 338 at an edge of the elongated aperture 342 as shown in FIGS. 16A–D. In some embodiments, the rib 386 also has a groove 388 defined therein, such as at a portion of the upper end of the rib 386 as shown in FIGS. 16A–D. In such embodiments, the groove 388 of the rib 386 can be dimensioned to receive a projection 384 positioned within one of the grooves 380 on the hub 330. The projection 384 located in groove 380 can divide the groove 380, and can be dimensioned to be received within the groove 388 of the rib 386.

In some embodiments, the locations of the grooves 380, 382 and rib 338 are reversed (e.g., a groove in the chassis 338 releasably mating with ribs on the hub 330). Also, in some embodiments, the grooves 380, 382 releasably mate with other features of the chassis 338, such as one or more pins, fingers, ribs, bumps, and other projections while still performing the same display control functions described herein.

Figure 16A:
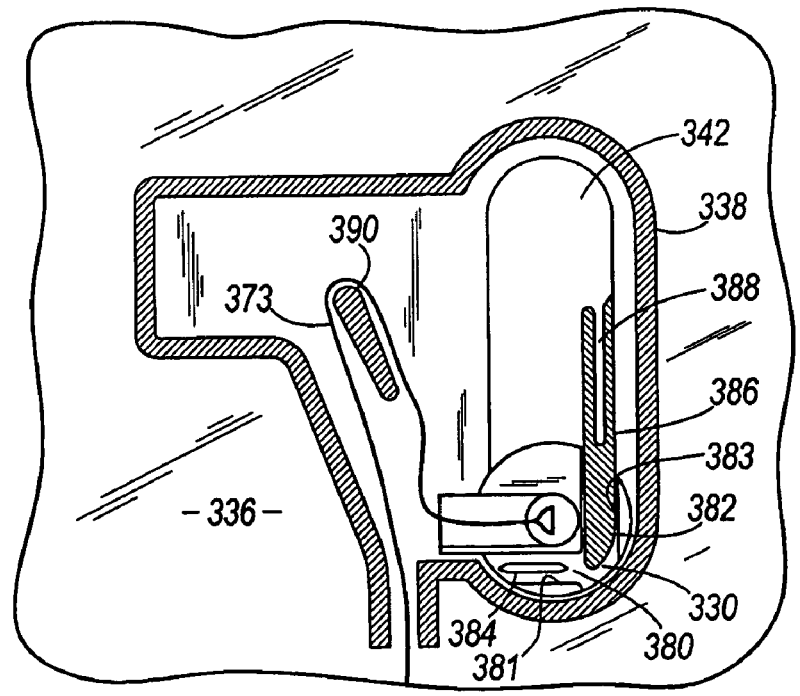
FIGS. 16A–16D are front views of a portion of a display according to an embodiment of the present invention, shown with the display screen and screen backing removed and in different positions and orientations.
Figure 16B:
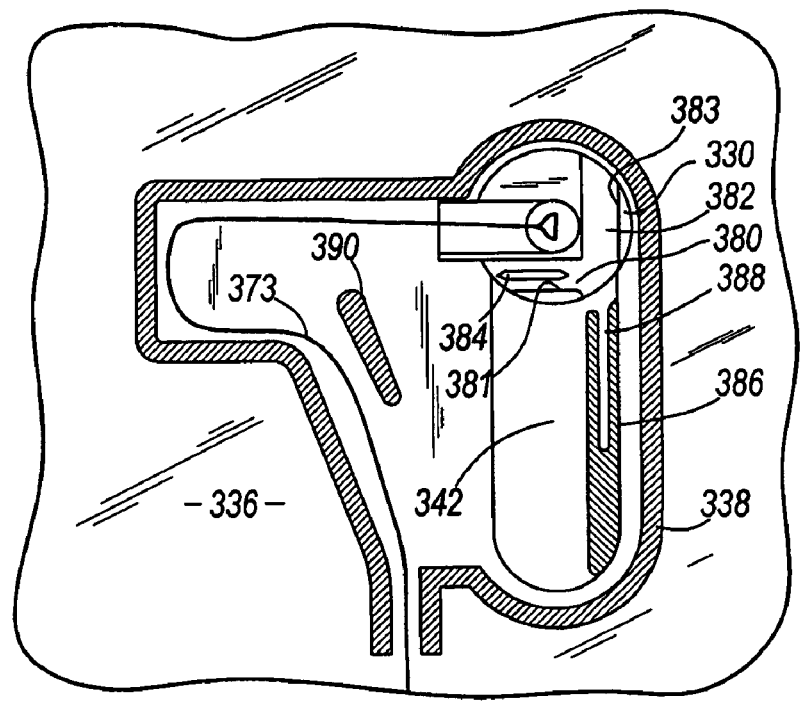
Figure 16C:
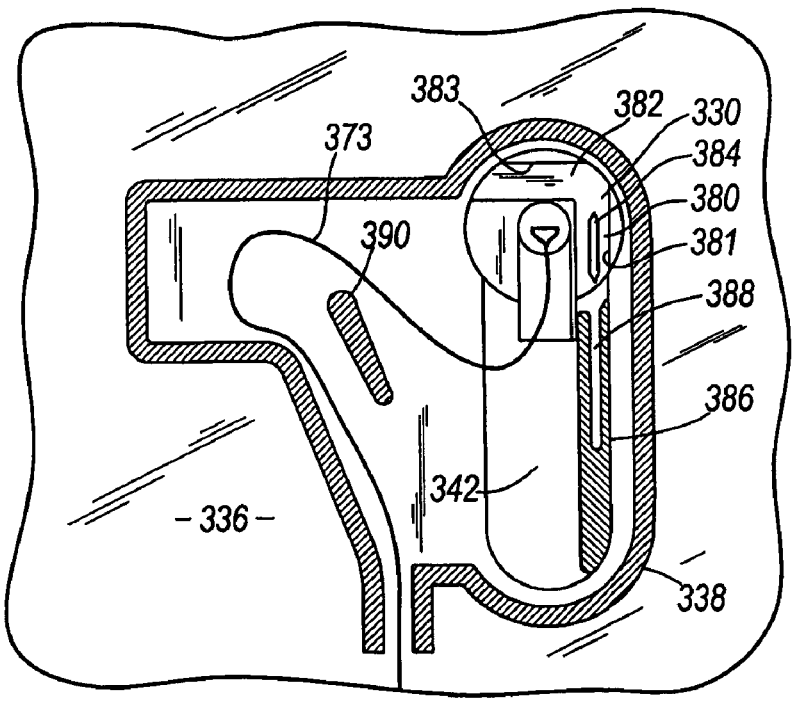
Figure 16D:
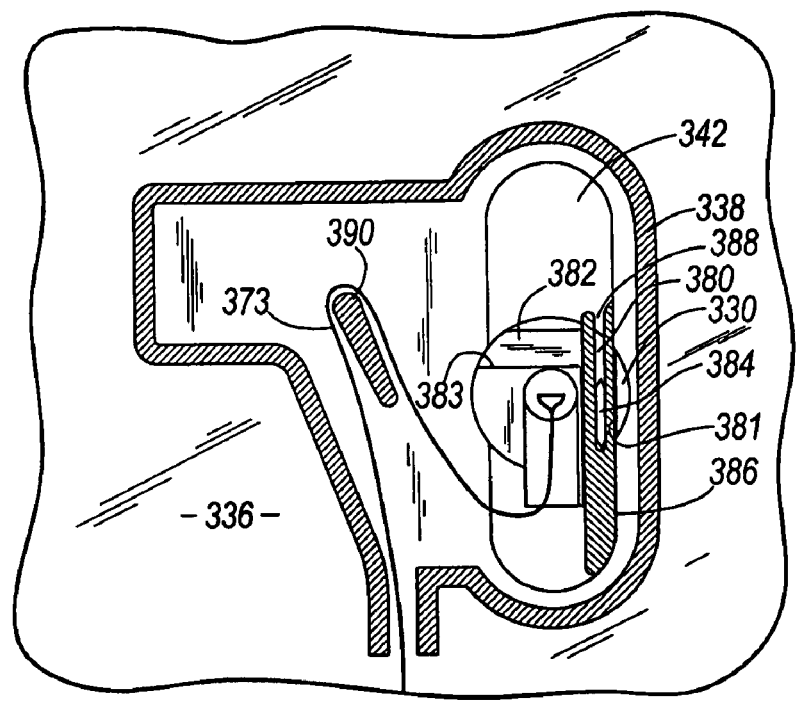

In operation, the display screen (not shown) can be moved from the landscape position to the portrait position as follows. First, the user translates the display screen in a substantially vertical direction. During translation, the engagement of groove 382 with rib 386 prevents substantially all rotation of the display screen. Once the hub 330 disengages the rib 386 (see FIGS. 16B and 16C), the hub 330 is free to rotate. Consequently, the display screen can be rotated from the landscape orientation to the portrait orientation. Once the display screen 324 and the hub 330 are rotated to the portrait orientation, the display screen and hub 330 can be translated to the position shown in FIG. 16D. As illustrated in FIG. 16D, the projection 384 located within groove 380 is received within the groove 388 of the rib 386. The engagement of the groove 380 and rib 386 in FIG. 16D prevents substantially all rotation of the display screen, while the projection 384 in the groove 380 can set the vertical position of the display screen. Accordingly, in the display control arrangement illustrated in FIGS. 16A–D, the display screen 324 can be resistant to or secured against rotation in both landscape and portrait orientations of the display screen.

The display control arrangement illustrated in FIGS. 16A–D employs releasably engagable features on the hub 330 and the housing 336 to perform the functions described above. However, it will be appreciated that the engagable features referred to (e.g., the grooves 380, 382 in the hub 330, rib 386 on the chassis 338, and the like) need not necessarily be located as described above and illustrated in FIGS. 16A–D. For example, the grooves 380, 382 (whether in the hub 330 or in the screen housing 336 as described above) can be located at different angles with respect to one another in order to orient the display screen 324 in different desired manners. As another example, the hub 330 need not engage with a rib 386 or other feature at the edge of the elongated aperture 342. Instead, the rib 386 (or other feature engagable with the hub 330) can be located a distance from the elongated aperture 342. In such cases, the hub 330 can be shaped differently to still engage with the rib 386, such as a hub with a flange, arm, or other radially extending feature that extends into engagement with the rib 386. Any feature or element on the chassis 338 or other portion of the screen housing can limit, stop, or otherwise control movement of the hub 330 as described herein.

Although the groove 388 illustrated in FIGS. 16A–D can be employed to retain the display screen 324 at a desired height, some embodiments of the present invention do not use the groove 388, and either have no feature or element to perform this function or do so in another manner.

The embodiment illustrated in FIGS. 16A–D also has a wire management feature. Specifically, the display screen wiring 373 is routed around a projection 390 prior to entering the hub 330. By routing the wiring 373 at least partially about one or more elements (such as projection 390), pinching and knotting of the wiring 373 due to movement of the hub 330 can be avoided.

Figure 17:
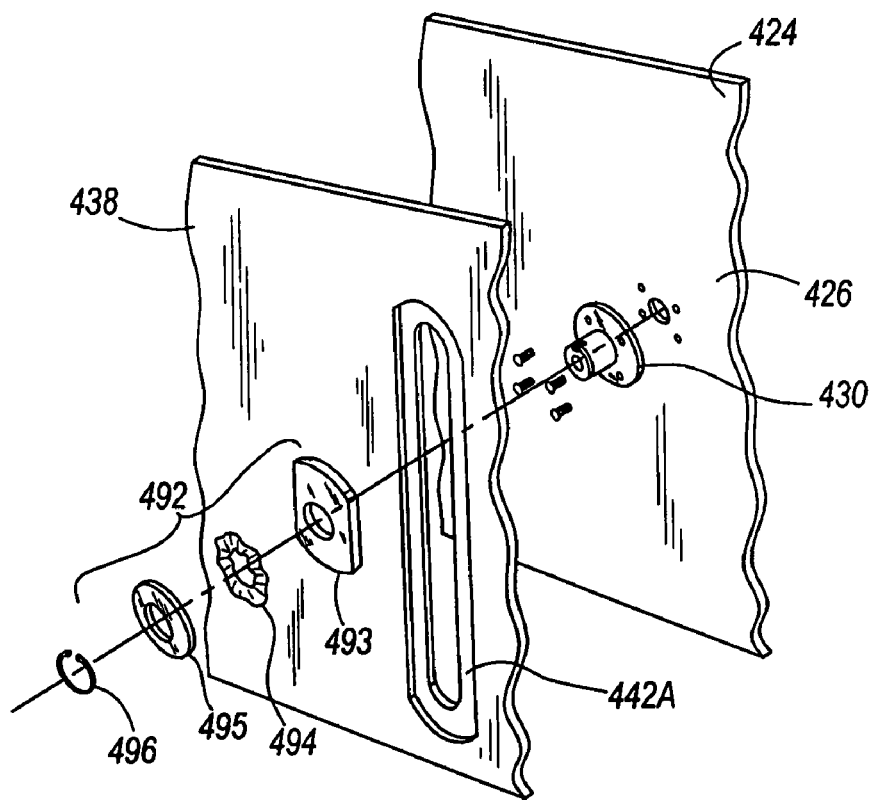
FIG. 17 is a rear perspective view of a portion of a display according to another alternative embodiment of the present invention.

FIG. 17 illustrates another display control arrangement according to the present invention. The elements and features of this embodiment are similar in many ways to elements and features in embodiments described above and illustrated in FIGS. 1–16D. Accordingly, the following description focuses primarily upon those elements and features that are different from the embodiments described above. Reference should be made to the above description for additional information regarding the elements, features, and possible alternatives to the elements and features of the display control arrangement illustrated in FIG. 17 and described below. Elements and features of the embodiment shown in FIG. 17 that correspond to elements and features of the embodiments of FIGS. 1–16D are designated hereinafter in the 400 series of reference numbers.

The clutch pack 492 illustrated in FIG. 17 can be employed in any of the other embodiments described herein in which an element of the display 12, 112, 212, 312 rides along an aperture of the chassis 38, 138, 238, 338 (or vice versa) as the display screen 24, 124, 224, 324 moves with respect to the chassis 38, 138, 238, 338. The clutch pack 492 causes frictional engagement between moving parts in order to prevent undesired movement of the display screen 424.

The clutch pack 492 illustrated in FIG. 17 includes a hub 430 extending from the screen backing 426, a double-D washer 493, a spring washer 494, a washer 495, and a snap ring 496. The hub 430 extends through the chassis 438 as described above with respect to the exemplary embodiments illustrated in FIGS. 13–16D. The double-D washer 493, spring washer 494, washer 495, and snap ring 496 are placed on the portion of the hub 430 projecting through the screen backing 426. The double-D washer 493 is the first element to be placed on the hub 430. The double-D washer 493 has two flat sides that fit within a recess 442A on the back side of the chassis 438. Next, the spring washer 494 is placed onto the hub 430 adjacent the double-D washer 493. The spring washer illustrated in FIG. 17 is a wave spring washer, although any other type of spring washer providing axial force under compression can be employed as desired. The spring washer 494 retains a load against the washers 493, 495 positioned on either side of the spring washer 494 to cause frictional engagement of the double-D washer 493 and/or the hub 430 against the chassis 438. However, the forces exerted by the spring washer 494 under compression are sufficiently low to enable movement of the double-D washer 493 along the recess 442A of the chassis 438, thereby allowing movement of the display screen 424.

The washer 495 can abut the spring washer 494, and a snap ring 496 can abut the washer 495 to retain these items on the hub 430. The snap ring 496 can engage a groove on the hub 430 to maintain engagement under axial loads. In other embodiments, the spring washer 494 can be kept under compression by any other element or elements connected to the hub 430. For example, a nut or threaded washer on a threaded end of the hub 430 can be used. As another example, a cotter pin can be used in place of the snap ring 496. Accordingly, in some embodiments, the washer 495 and snap ring 496 can be replaced by a single element providing a desired pressure upon the spring washer 494 while also retaining the clutch pack 492 on the hub 430 as described above.

Although the washer 493 described above and illustrated in FIG. 17 is a double-D washer received within and movable along a recess 442A, it should be noted that any other washer having any other shape can instead be employed for frictional engagement with the chassis 438, and need not necessarily be received and ride within the a recess 442A. In some embodiments, other types of elements (besides a washer-shaped element) can be employed, such as a block or other member received upon the hub 430.

As is true for the previous display control device embodiments, the display control device illustrated in FIG. 17 can be used in conjunction with substantially any embodiment of rotational display discussed herein. For example, this device can be used in conjunction with any of the embodiments shown in FIGS. 13–16D. Furthermore, with only slight modifications, the illustrated control feature of FIG. 17 can be used with the embodiments illustrated in FIGS. 1–12C (e.g., to provide a clutch pack for the pivots 47, 47' within their apertures 43, 43', to provide a clutch pack for the projection 51, 51' within the aperture 49, 49').

Figure 18:
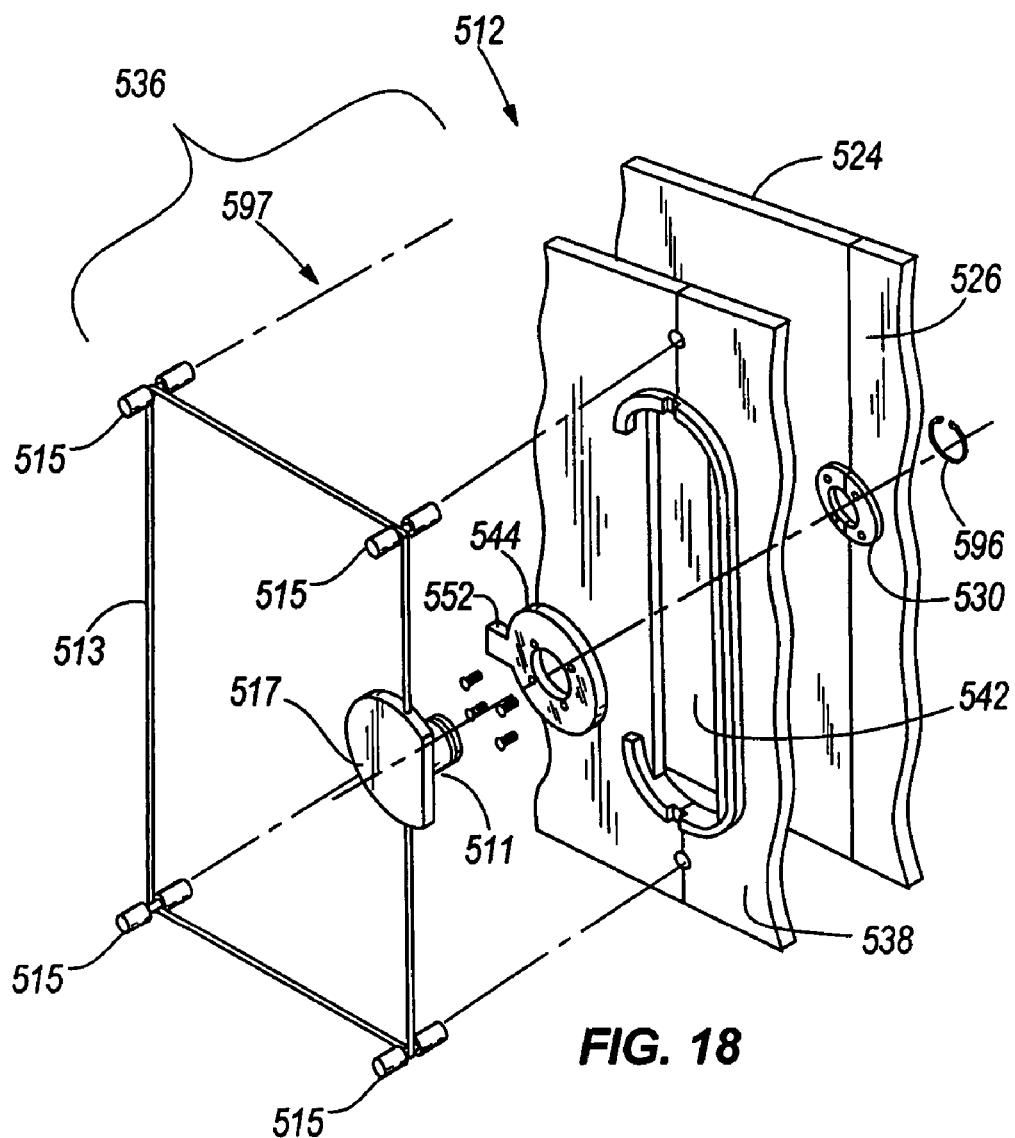
FIG. 18 is a rear perspective view of a portion of a display according to yet another alternative embodiment of the present invention.

FIG. 18 illustrates yet another display control arrangement according to the present invention. The elements and features of this embodiment are similar in many ways to elements and features in embodiments described above and illustrated in FIGS. 1–17. Accordingly, the following description focuses primarily upon those elements and features that are different from the embodiments described above. Reference should be made to the above description for additional information regarding the elements, features, and possible alternatives to the elements and features of the display control arrangement illustrated in FIG. 18 and described below. Elements and features of the embodiment shown in FIG. 18 that correspond to elements and features of the embodiments of FIGS. 1–17 are designated hereinafter in the 500 series of reference numbers.

The display control assembly 597 illustrated in FIG. 18 can be employed in any of the other embodiments described herein to control an amount of force necessary to lift, lower, or otherwise move one element of the display 512 with respect to another. In some embodiments, this display control assembly 597 can employ friction between a cable 513 passed at least partially about a plurality of elements (e.g., posts 515 in FIG. 18) to hold the display screen 524 in a desired position. In the illustrated embodiment of FIG. 18, a hub 530 extends from the screen backing 526 and into an aperture 542 of the chassis 538. A clamp plate 544 having an extension 552 is fastened to the hub 530. An aperture extends through the clamp plate 544, hub 530, and screen backing 526. A rod 511 having a flanged end extends through the aperture in the clamp plate 544 and the hub 530 (and in some embodiments, the screen backing 526). The rod 511 can be engaged by a snap ring 596 to retain the rod 511 in position with respect to the clamp plate 544 and hub 530 (and screen backing 526, in some embodiments). For this purpose, the rod 511 can have a groove to help retain the snap ring 596 against axial forces.

As described above, the rod 511 in the illustrated embodiment of FIG. 18 is coupled to a cable 513 running at least partially around a plurality of posts 515. These posts 515 can extend from the chassis 538 or other portion of the screen housing 536. As illustrated, the posts 515 can each have a recessed portion to help retain the cable 513 on each post 515. The cable 513 can be sufficiently tight about the posts 515 to cause frictional engagement between the posts 515 and the cable 513. However, the frictional engagement is not so great that the frictional engagement prevents movement of the display screen 524. Instead, the frictional engagement can be overcome by a user adjusting the position of the display screen 524, such as by lifting or pushing the display screen 524.

In some embodiments, the cable 513 can extend about rollers, bearings, pulleys or other rotating elements, any of which can be supported upon the posts 515 or supported upon the screen housing 536 in any other suitable manner. Furthermore, the cable 513 can be replaced by any other flexible elongated element (e.g., a strap, wire, chain, cord, band, and the like) passed about rotating or non-rotating elements.

The cable 513 is coupled to a carriage 517 from which the rod 511 extends. The cable 513 can be attached to the carriage 517 in any manner desired, such as by welding, brazing, or soldering, by adhesive or cohesive bonding material, by crimping material of the carriage 517 about or upon the cable 513, by one or more fasteners, and the like.

By connecting the carriage 517 with the cable 513, the carriage 517 moves with the display screen 524 between the positions of the display screen 524, and therefore can exert resistance against movement of the display screen 524 by the frictional engagement between the cable 513 and the posts 515 or other elements about which the cable 513 passes. It will be appreciated that a connection between the display screen 524 and the cable 513 can be made in a number of other manners. For example, the cable 513 can be connected directly to the hub 530 or directly to the clamp plate 544 (in any of the manners described above with reference to the connection between the cable 513 and the carriage 517). As another example, the cable 513 and posts 515 can be connected to any other element of or extending from the display screen 524 or screen backing 526. In this regard, such an element need not necessarily extend through an aperture 542 in the chassis 538. Instead, the cable 513 and posts 515 can be located between the chassis 538 and display screen 524 for any type of connection described above.

Some embodiments of the display control assembly 597 illustrated in FIG. 18 can also include an adjustment member allowing the tension of the cable 513 to be adjusted (thereby adjusting the frictional engagement of the cable 513 with the posts 515, and the resistance to movement upon the display screen 524). The adjustment member can include any tensioning mechanism to which the cable 513 can be connected, such as a turnbuckle, a post or roller assembly upon an adjustable arm or mount (movable to move the post or roller with respect to the cable 513), any other element moveable with respect to the cable 513 to exert different forces upon the cable 513, and the like. In some embodiments, a fastener can be turned in a first direction to cause a moveable element to engage or further engage the cable 513 to increase the amount of friction between the posts 515 and the cable 513. The fastener can also be rotated in an opposite direction to reduce the amount of friction between the posts 515 and the cable 513.

In some embodiments, the display control assembly 597 is employed to assist in moving the display screen 524 by providing at least one counterweight on the cable 513. This function can be performed in addition to controlling screen movement by frictional cable engagement (as described above) or in other embodiments in which such frictional cable engagement is not employed. In the illustrated embodiment of FIG. 18, a counterweight can be attached to the cable 513 in a position opposite or substantially opposite the position at which the hub 530 is coupled to the cable 513. The counterweight can have a weight selected to provide desired movement of the display screen 524. For example, the counterweight can have a weight sufficient to slightly reduce the lifting force needed to lift the display screen 524, to substantially reduce this lifting force, or to entirely reduce this lifting force (in which case the display screen 524 can be lifted without force from the user).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the various embodiments (and alternatives thereto) of the present invention described above and illustrated in the figures are not mutually exclusive of one another. With the exception of features, elements, and manners of operation that are mutually exclusive of or are inconsistent with one another, the features, elements and manners of operation of any of the embodiments can be employed in any of the other embodiments in any combination.

What is claimed is:

1. An apparatus for rotating a display screen relative to a housing from a first orientation to a second orientation, wherein the display screen lies in a plane, the apparatus comprising:
   a first link pivotably coupled to the housing at a first point, and pivotably coupled to the display screen at a second point located a distance from the first point; and
   a second link pivotably coupled to the housing at a third point located a distance from the first and second points, and pivotably coupled to the display screen at a fourth point located a distance from the first, second, and third points;
   the first link positioned relative to the second link to allow movement of the screen relative to the housing from the first orientation in the plane to the second orientation substantially in the plane.

2. The apparatus of claim 1, further comprising a backing coupled to a back side of the display screen, wherein the first and second links are coupled to the display screen via the backing.

3. The apparatus of claim 1, wherein:
   the housing comprises a chassis; and
   the first and second links are coupled to the housing via the chassis.

4. The apparatus of claim 3, wherein:
   a first elongated curved aperture and a second elongated curved aperture are defined in the chassis;
   the first link is coupled within the first curved aperture proximate the first point; and
   the second link is coupled within the second curved aperture proximate the third point.

5. The apparatus of claim 1, wherein:
   the first link is coupled to the housing by a first pivot; and
   the second link is coupled to the housing by a second pivot.

6. The apparatus of claim 5, wherein:
   the first link is coupled to the display screen by a third pivot; and
   the second link is coupled to the display screen by a fourth pivot.

7. The apparatus of claim 5, wherein:
   the first pivot is received within and movable along a first elongated curved aperture in the housing; and
   the second pivot is received within and movable along a second elongated curved aperture in the housing.

8. The apparatus of claim 1, wherein the first orientation is a landscape orientation and the second position is a portrait orientation.

9. The apparatus of claim 1, wherein the display screen is further rotatable with respect to an axis lying substantially in the plane.

10. A method of pivoting a display screen from a landscape orientation to a portrait orientation, the method comprising:
    rotating the display screen relative to a display housing and substantially in a plane in which the display screen lies;
    rotating the display screen with respect to a first link and about a first axis passing through the plane in response to rotating the display screen, the first link coupling the display screen to a housing;
    rotating the display screen with respect to a second link and about a second axis passing through the plane in response to rotating the display screen, the second link coupling the display screen to the housing; and
controlling movement of the display screen relative to the display housing with the first and second links.

11. The method as claimed in claim 10, further comprising a display screen backing coupled to the display screen, wherein the first link is coupled to the display screen via the display screen backing.

12. The method as claimed in claim 10, further comprising:
rotating the first link with respect to the housing and about a third axis passing through the plane in response to rotating the display screen; and
rotating the second link with respect to the housing and about a fourth axis passing through the plane in response to rotating the display screen.

13. The method of claim 10, further comprising:
guiding the first link in a first curved aperture defined in the housing; and
guiding the second link in a second curved aperture defined in the housing.

14. The method of claim 10, wherein rotating the display screen with respect to the first link comprises rotating at least one of the display screen and the first link with respect to a first pivot extending between the display screen and the first link.

15. The method of claim 14, wherein rotating the display screen with respect to the second link comprises rotating at least one of the display screen and the second link with respect to a second pivot extending between the display screen and the second link.

16. The method of claim 14, further comprising guiding a portion of the first pivot along at least a portion of a first curved aperture defined in one of a display screen backing coupled to the display screen and the display housing.

17. The method of claim 15, further comprising:
guiding a portion of the first pivot along at least a portion of a first curved aperture defined in one of a display screen backing coupled to the display screen and the display housing; and
guiding a portion of the second pivot along at least a portion of a second curved aperture defined in one of the display screen backing and the display housing.

18. A pivotable display apparatus for a computer, comprising:
a display screen;
a housing pivotally coupled to the display screen and having a first elongated aperture and a second elongated aperture;
a hub extending away from the display screen into the first elongated aperture of the housing, the hub moveable within and along the first elongated aperture; and
a projection extending from the display screen into the second elongated aperture of the housing, the projection limiting rotation of the display screen with respect to the housing in a portion of a range of movement of the hub within the first elongated aperture.

19. The apparatus of claim 18, wherein the hub extends from a screen backing coupled to the display screen.

20. The apparatus of claim 18, wherein the hub moves in a substantially straight path within the first elongated aperture.

21. The apparatus of claim 18, wherein the hub is rotatable within the first elongated aperture.

22. The apparatus of claim 18, wherein at least a portion of the second elongated aperture is shaped similarly to a corresponding portion of the first elongated aperture.

23. The apparatus of claim 18, wherein the second elongated aperture has a substantially straight portion and a curved portion in which the second elongated aperture permits rotation of the display screen relative to the housing.

24. The apparatus of claim 23, wherein rotation of the display screen is substantially prevented by the projection within the straight portion of the second elongated aperture.

25. A display orientation device for a display screen coupled to a display housing and rotatable within a plane in which the display screen lies, the display screen having a first orientation with respect to the display housing and a second orientation with respect to the display housing, the display orientation device comprising:
a hub extending between the display screen and the display housing, the hub coupled to the display screen in the first and second orientations and preventing rotation of the display screen in the first and second orientations, the hub movable from the first and second orientations to an intermediate position in which the hub and the display screen are rotatable with respect to the display housing.

26. The device of claim 25, wherein:
the hub has a first and second apertures defined therein;
the first aperture is oriented substantially perpendicular to the second aperture; and
the first aperture is oriented to engage a portion of the housing in the first orientation of the display screen; and
the second aperture is oriented to engage the portion of the housing in the second orientation of the display screen.

27. The device of claim 26, wherein the portion of the housing is a projection slidably received within the first and second apertures.

28. The device of claim 26, wherein the portion of the housing has an aperture dimensioned to receive a projection of the hub.

29. A display screen control apparatus for a display screen movable within a plane in which the display screen lies and movable with respect to a display screen housing, the apparatus comprising:
a projection extending between the display screen and the display screen housing; and
a bias element coupled to the projection and positioned to exert a bias force upon the projection to urge the display screen in a direction, the display screen movable with respect to the display screen housing under the bias force exerted by the bias element.

30. The apparatus, of claim 29, wherein the projection extends away from the display screen and is movable with respect to the display screen housing.

31. The apparatus of claim 29, wherein the bias element is coupled to and between the projection and the display screen housing.

32. A display screen latching apparatus for a display screen movable with respect to a display screen housing and in a plane in which the display screen lies, the display screen latching apparatus comprising:
a catch releasably coupled to the display screen;
a user-manipulatable control coupled to the catch and operable by a user to actuate the catch between latched and unlatched positions;
the display screen restrained from movement in the plane with respect to the display screen housing when the catch is in the latched position, and movable in the plane with respect to the display screen housing when the catch is released by the user-manipulatable control to the unlatched position.

33. The apparatus of claim 32, wherein the catch is releasably engagable with one of a projection and an aperture on a screen backing to releasably couple the catch to the display screen.

34. The apparatus of claim 32, wherein:
the display screen is rotatable in the plane; and
the catch is releasably coupled to the display screen to selectively restrain rotation of the display screen with respect to the display screen housing.

35. The apparatus of claim 32, wherein:
the display screen is translatable in the plane; and
the catch is releasably coupled to the display screen to selectively restrain translation of the display screen with respect to the display screen housing.

36. The apparatus of claim 32, further comprising a bias element positioned to bias the catch into the latched position.

37. The apparatus of claim 32, wherein the catch is actuatable by rod coupled to the user-manipulatable control.

38. The apparatus of claim 32, wherein the display screen is rotatable with respect to the display screen housing between a landscape orientation and a portrait orientation.

39. A display screen control apparatus for a display screen movable within a plane in which the display screen lies and movable with respect to a display screen housing, the apparatus comprising:
a hub extending between the display screen and the display screen housing and received within an aperture in the display screen housing;
a slide coupled to the hub and movable to a plurality of different positions along the aperture corresponding to a plurality of different positions of the display screen with respect to the display screen housing;
a resiliently deformable washer coupled to the hub and exerting a load upon the slide to bias the slide into frictional engagement with the housing; and
a fastener coupled to the hub to retain the resiliently deformable washer on the hub.

40. A display screen control apparatus for a display screen movable within a plane in which the display screen lies and movable with respect to a display screen housing, the apparatus comprising:
at least one projection extending from the display screen housing;
an elongated flexible element coupled to the display screen housing and extending at least partially around the at least one projection; and
a hub coupled to the display screen and to the elongated flexible element;
the elongated flexible element movable about the at least one projection to at least partially control movement of the hub and display screen with respect to the display screen housing.

41. The apparatus of claim 40, wherein the hub is received within and is movable along an elongated aperture in the housing in movement of the display screen with respect to the display screen housing.

42. A method of rotating a display screen with respect to a computer, comprising:
providing a first electrical connection between the display screen and the computer in a first orientation of the display screen;
rotating the display from the first orientation;
disconnecting the first electrical connection by rotating the display from the first orientation;
rotating the display to a second orientation different than the first orientation; and
establishing a second electrical connection between the display screen and the computer by rotating the display to the second orientation.

43. A display releasably coupled to a first electrical connector establishing at least one of power and communication to the display, the display comprising:
a display screen rotatable within a plane in which the display screen lies, rotatable with respect to a display screen housing, and rotatable between first and second orientations with respect to the display screen housing; and
a second electrical connector coupled to the display screen and selectively electrically coupled to the first electrical connector by rotation of the display screen between the first and second orientations.

* * * * *